(12) United States Patent
Zimmer et al.

(10) Patent No.: US 6,816,669 B2
(45) Date of Patent: Nov. 9, 2004

(54) VAPORIZER WITH CAPACITY CONTROL VALVE

(75) Inventors: George M. Zimmer, Kent, WA (US); Thomas H. Kingman, Seattle, WA (US)

(73) Assignee: Algas-SDI International LLC, Seattle, WA (US)

( * ) Notice: Subject to any disclaimer, the term of this patent is extended or adjusted under 35 U.S.C. 154(b) by 145 days.

(21) Appl. No.: 09/878,870

(22) Filed: Jun. 8, 2001

(65) Prior Publication Data

US 2002/0186966 A1 Dec. 12, 2002

(51) Int. Cl.[7] .......................... F22B 29/06; G05D 23/00
(52) U.S. Cl. .................................. 392/397; 236/92 R
(58) Field of Search .............................. 392/386, 387, 392/394, 396, 397, 398, 401, 402; 261/133, 134, 141, 142, 38, 39.1, 42; 236/92 R, 92 A, 92 B, 92 C, 93 C, 93 A

(56) References Cited

U.S. PATENT DOCUMENTS

| | | | |
|---|---|---|---|
| 2,856,759 A | * | 10/1958 | Barbulesco ............... 62/211 |
| 3,250,723 A | * | 5/1966 | Fortney .................... 516/2 |
| 3,475,916 A | | 11/1969 | Smith ....................... 62/52 |
| 3,676,642 A | | 7/1972 | Rosen et al. ............ 219/301 |
| 3,964,859 A | | 6/1976 | Nishi et al. .............. 431/78 |
| 4,032,070 A | * | 6/1977 | Nielsen ................. 236/92 B |
| 4,255,646 A | | 3/1981 | Dragoy et al. .......... 219/275 |
| 4,399,349 A | | 8/1983 | Deming et al. ......... 219/276 |
| 4,465,458 A | | 8/1984 | Nishino et al. .......... 431/208 |
| 4,483,304 A | | 11/1984 | Yokoi et al. ............ 123/549 |
| 4,625,910 A | | 12/1986 | Kawamura .............. 237/2 A |
| 4,645,904 A | * | 2/1987 | Moraski et al. ......... 392/401 |
| 4,713,524 A | | 12/1987 | Leo et al. ............... 219/307 |
| 4,811,720 A | | 3/1989 | Katumata et al. ....... 123/527 |
| 4,874,924 A | | 10/1989 | Yamamoto et al. ..... 219/274 |
| 4,898,142 A | | 2/1990 | Van Wechem et al. .. 123/557 |
| 4,903,850 A | | 2/1990 | Frank et al. ............. 219/271 |
| 5,005,370 A | | 4/1991 | Tanaka et al. ............ 62/211 |
| 5,182,942 A | | 2/1993 | Hartel et al. ........... 73/61.46 |

(List continued on next page.)

FOREIGN PATENT DOCUMENTS

| | | |
|---|---|---|
| DE | 764 226 | 6/1953 |
| DE | 12 33 889 | 2/1967 |
| EP | 1 139 007 | 10/2001 |

*Primary Examiner*—Sang Paik
(74) *Attorney, Agent, or Firm*—Seed IP Law Group PLLC

(57) ABSTRACT

A vaporizer for liquefied gas, such as liquefied petroleum gas, which includes a heat exchanger and a capacity control valve for controlling the inflow of liquefied gas to the heat exchanger. The heat exchanger has an inlet to accept liquefied gas and an outlet to release superheated gas vapor. The capacity control valve has an inlet to accept the liquefied gas from a source of liquefied gas, an outlet coupled to the inlet of the heat exchanger. The capacity control valve includes a valve positioned between the inlet and outlet of the capacity control valve, and movable between fully closed and fully open positions. The capacity control valve includes a diaphragm positioned between a thermal expansion chamber with a pressure dependent on the temperature of the gas vapor in the outlet of the heat exchanger sensed by a sensing bulb, and a liquefied gas inlet chamber with the pressure dependent on the pressure of the liquefied gas being supplied to the vaporizer by the liquefied gas source. The movements of the diaphragm move the value to regulate the flow of liquefied gas to the heat exchanger.

56 Claims, 9 Drawing Sheets

U.S. PATENT DOCUMENTS

| | | | |
|---|---|---|---|
| 5,400,969 A | 3/1995 | Keene | 239/136 |
| 5,401,935 A | 3/1995 | Smith et al. | 219/206 |
| 5,609,297 A | 3/1997 | Gladigow et al. | 239/135 |
| 5,644,866 A | 7/1997 | Katsuda et al. | 43/129 |
| 5,796,914 A | 8/1998 | Gatzemeyer et al. | 392/390 |
| 5,825,975 A | 10/1998 | Privas | 392/404 |
| 5,870,524 A * | 2/1999 | Swiatosz | 392/394 |
| 5,873,354 A | 2/1999 | Krohn et al. | 123/549 |
| 5,947,091 A | 9/1999 | Krohn et al. | 123/549 |
| 5,966,499 A * | 10/1999 | Hinkle et al. | 392/388 |
| 6,044,825 A | 4/2000 | Carter et al. | 123/557 |
| 6,058,915 A | 5/2000 | Abidin et al. | 123/546 |
| 6,076,359 A * | 6/2000 | Jurcik et al. | 62/50.2 |
| 6,124,570 A | 9/2000 | Ebner et al. | 219/202 |
| 6,157,774 A * | 12/2000 | Komino et al. | 392/387 |
| 6,584,998 B1 * | 7/2003 | Milner | 137/486 |

* cited by examiner

VAPORIZER WITH CAPACITY CONTROL VALVE

TECHNICAL FIELD

This invention relates to a vaporizer for vaporizing liquefied gases, and in particular, to a vaporizer using a capacity control valve for controlling an input flow rate of the liquefied gas, such as liquefied petroleum gas, to the vaporizer.

BACKGROUND OF THE INVENTION

Vaporizers for the controlled vaporization of liquefied gases are generally known. One electrically heated liquefied petroleum gas (LPG) vaporizer is disclosed in U.S. Pat. No. 4,255,646. Another liquefied gas vaporizer is disclosed in U.S. Pat. No. 4,645,904. Typically, such vaporizers includes a pressure vessel having a liquefied gas inlet near a lower end and a gas vapor outlet near a closed upper end remote from the liquefied gas inlet. A heating core is disposed within the pressure vessel, usually positioned close to the lower end, and typically comprises an electric heating element, but can be of other types.

Various means are known for ensuring that a sufficient flow of liquefied gas is provided to the vaporizer without flooding the vaporizer and saturating the gas vapor at the outlet with liquefied gas. For example, a temperature sensor has been used to measure the temperature of the gas vapor in the gas vapor outlet and close a solenoid valve on the liquefied gas inlet if the outlet temperature becomes low, indicating saturation of the gas vapor. An optical sensor has also been used to sense the presence of liquid in the gas vapor to regulate the inflow of the liquefied gas to the vaporizer.

The vaporizer may also have liquefied gas sensing means communicating with the interior of the pressure vessel near its upper end, below the gas vapor outlet. The liquefied gas sensing means is typically a float switch for sensing the level of liquefied gas in the pressure vessel and controlling a valve to stop the inflow of liquefied gas to the vaporizer. The valve stops the flow of liquefied gas to the liquefied gas inlet before the liquefied gas floods through the outlet of the vaporizer.

It is desirable to have better regulation of the liquefied gas inflow to the vaporizer to prevent saturation or "flooding" at the gas vapor outlet, to generate gas vapor at the gas vapor outlet with the desired temperature, and to promote maximum efficiency of the vaporizer using a reliable and inexpensive control arrangement.

SUMMARY OF THE INVENTION

The present invention is embodied in a vaporizer for vaporizing a liquefied gas supplied by a source of liquefied gas and useable with a heat source. The vaporizer includes a heat exchanger having an inlet structured to accept liquefied gas, a heat exchanger portion to boil and superheat the accepted liquefied gas to produce a gas vapor using the heat supplied by the heat source, and an outlet structured to release the gas vapor. A temperature sensor is arranged to sense the temperature of the gas vapor produced by the heat exchanger and produce a sensed temperature pressure in response to the sensed temperature. A pressure sensor is arranged to sense the difference in the sensed temperature pressure and a pressure of the liquefied gas supplied by the source of liquefied gas. A flow regulator valve is arranged to regulate the flow of liquefied gas from the source of liquefied gas to the heat exchanger inlet in response to the pressure sensor sensing the difference in the sensed temperature pressure and the pressure of the liquefied gas supplied by the source of liquefied gas.

In one embodiment, the temperature sensor is arranged to sense the temperature of the gas vapor at the heat exchanger outlet. In the one embodiment the vaporizer further includes a biasing member producing a biasing force to bias the flow regulator to reduce the flow of liquefied gas to the heat exchanger inlet, and an adjustment member arranged to selectively adjust the biasing force produced by the biasing member.

The flow regulator is arranged to increase the flow of liquefied gas to the heat exchanger inlet in response to the pressure sensor sensing the difference in the sensed temperature pressure and the pressure of the liquefied gas supplied by the source of liquefied gas being one of increasing and decreasing, and decrease the flow of liquefied gas to the heat exchanger inlet in response to the pressure sensor sensing the difference in the sensed temperature pressure and the pressure of the liquefied gas supplied by the source of liquefied gas being the other of increasing and decreasing.

In the one embodiment the flow regulator is a valve, particularly, a control valve having a valve body with a liquefied gas inlet chamber and a liquefied gas outlet chamber. The control valve has a valve inlet in fluid communication with the liquefied gas inlet chamber and structured to be coupled to and accept the liquefied gas supplied by the source of liquefied gas, and a valve outlet in fluid communication with the liquefied gas outlet chamber and connected to the heat exchanger inlet. The control valve further includes a valve positioned between the liquefied gas inlet chamber and the liquefied gas outlet chamber, with the valve being movable toward a closed configuration to reduce the flow of liquefied gas from the liquefied gas inlet chamber to the liquefied gas outlet chamber and toward an open configuration to increase the flow of liquefied gas from the liquefied gas inlet chamber to the liquefied gas outlet chamber. The valve being moved toward the closed and open configurations in response to the pressure sensor sensing the difference in the sensed temperature pressure and the pressure of the liquefied gas supplied by the source of liquefied gas.

In one embodiment the control valve is a capacity control valve having a valve body with a thermal expansion chamber, a liquefied gas inlet chamber and a liquefied gas outlet chamber. A diaphragm within the valve body divides the thermal expansion chamber from the liquefied gas inlet chamber. The diaphragm is movable in response to a pressure imbalance in the thermal expansion chamber and the liquefied gas inlet chamber.

In this embodiment the temperature sensor is a temperature sensing member positioned to sense the temperature of the released gas vapor from the heat exchanger outlet and has an expansion fluid therein in fluid communication with the thermal expansion chamber. The capacity control valve further includes a valve inlet in fluid communication with the liquefied gas inlet chamber and structured to be coupled to and accept the liquefied gas supplied by the source of liquefied gas, and a valve outlet in fluid communication with the liquefied gas outlet chamber and connected to the heat exchanger inlet. The capacity control valve further includes a valve positioned between the liquefied gas inlet chamber and the liquefied gas outlet chamber. The valve is movable toward a closed configuration to reduce the flow of liquefied gas from the liquefied gas inlet chamber to the liquefied gas outlet chamber and toward an open configuration to increase the flow of liquefied gas from the liquefied gas inlet chamber to the liquefied gas outlet chamber. The valve is moved toward the closed and open configurations in response to movements of the diaphragm resulting from the differential pressure in the thermal expansion chamber and the liquefied gas inlet chamber, with the pressure in the thermal expansion chamber being dependent on the sensed temperature of the released gas vapor from the heat exchanger outlet and the pressure in the liquefied gas inlet chamber being dependent on the pressure of the liquefied gas supplied by the source of liquefied gas.

In this embodiment the temperature sensing member is a sensing bulb thermally coupled to the heat exchanger outlet and the expansion fluid is communicated to the thermal expansion chamber by a tube in fluid communication with the thermal expansion chamber. The expansion fluid is selected to have saturation properties similar to saturation properties of the liquefied gas supplied by the source of liquefied gas.

The capacity control valve further includes an auxiliary pressure device producing a biasing pressure on the valve to bias the valve toward the closed configuration. The auxiliary pressure device has an adjustment member to adjustably select the biasing pressure produced by the auxiliary pressure device.

The diaphragm and the valve are connected together such that movement of the diaphragm toward the thermal expansion chamber moves the valve toward the closed configuration and movement of the diaphragm toward the liquefied gas inlet chamber moves the valve toward the open configuration.

In some embodiments a second valve is utilized with the control valve controlling operation of the second valve.

A method is also disclosed for vaporizing a liquefied gas. The method includes introducing a quantity of liquefied gas into a heat exchanger at a flow rate; vaporizing the liquefied gas in the heat exchanger to produce a gas vapor; sensing the temperature of the gas vapor produced by the heat exchanger; generating a sensed temperature pressure in response to the sensed temperature; sensing a difference in the sensed temperature pressure and a pressure of the liquefied gas supplied by the source of liquefied gas; and adjusting the flow rate of the liquefied gas into the heat exchanger in response to sensing the difference in the sensed temperature pressure and the pressure of the liquefied gas supplied by the source of liquefied gas.

Other features and advantages of the invention will become apparent from the following detailed description, taken in conjunction with the accompanying drawings.

DETAILED DESCRIPTION OF THE INVENTION

Figure 1:
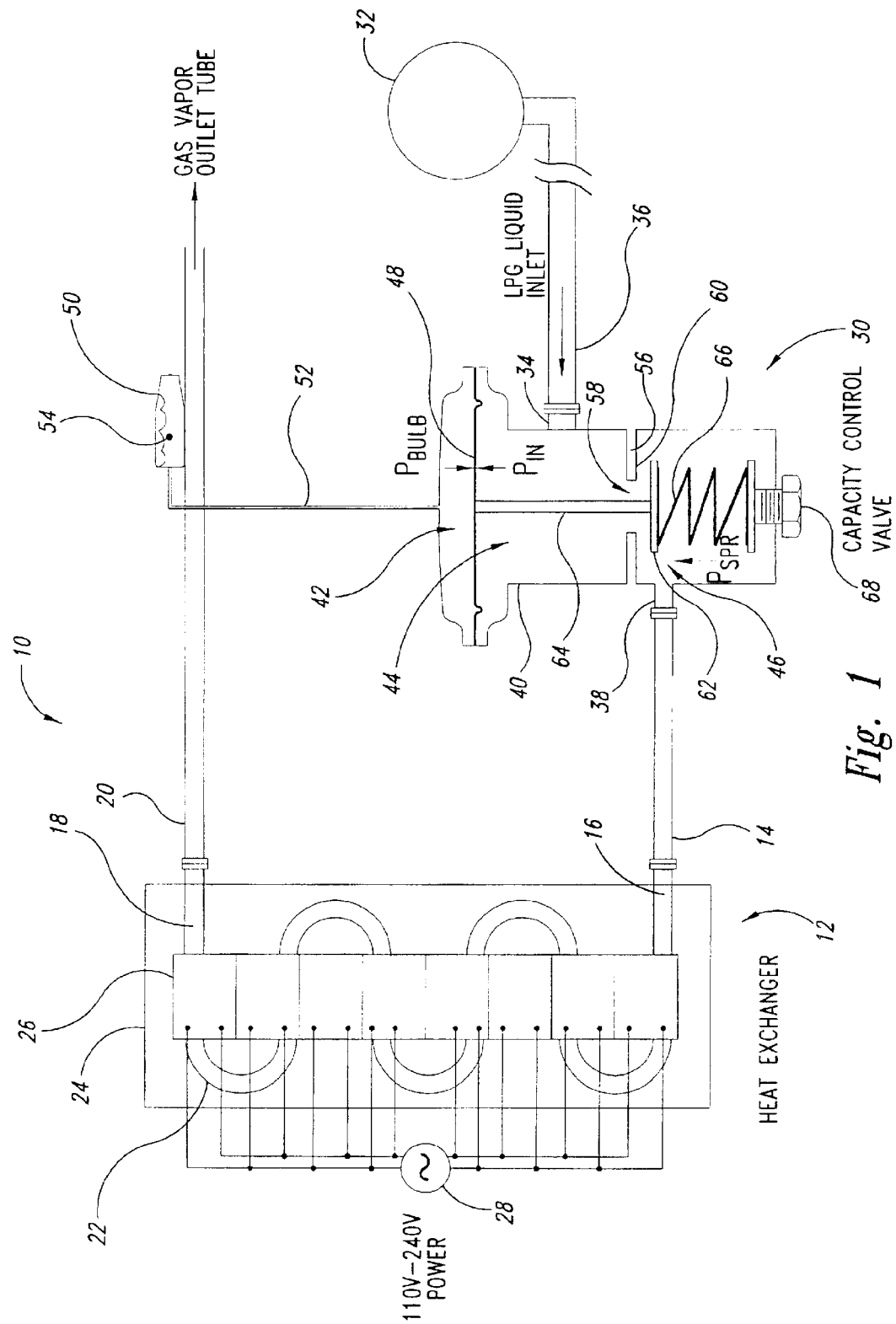
FIG. 1 is a schematic view of a vaporizer having a capacity control valve used at the inlet of a heat exchanger and embodying the present invention.

An embodiment of a liquefied gas vaporizer 10 of the present invention is illustrated in FIG. 1, and includes a heat exchanger 12 which may be of a variety of constructions. A liquefied gas inlet tube 14 is connected to an inlet 16 of the heat exchanger 12 to supply liquefied gas thereto for vaporization. In the illustrated embodiment, the liquefied gas is liquefied petroleum gas (LPG). The vaporized gas exists the heat exchanger 12 from an outlet 18 connected to a gas vapor outlet tube 20. Although any conventional heat exchanger may be used, such as those illustrated in the above-identified U.S. Pat. Nos. 4,645,904 and 4,255,646, the illustrated heat exchanger 12 includes an integral vaporization tube 22 encased in an aluminum block 24. The vaporization tube 22 extends between the inlet 16 and outlet 18 of the heat exchanger 12, with the outlet positioned above the inlet. More than one vaporization tube 22 may be used.

Figure 1A:
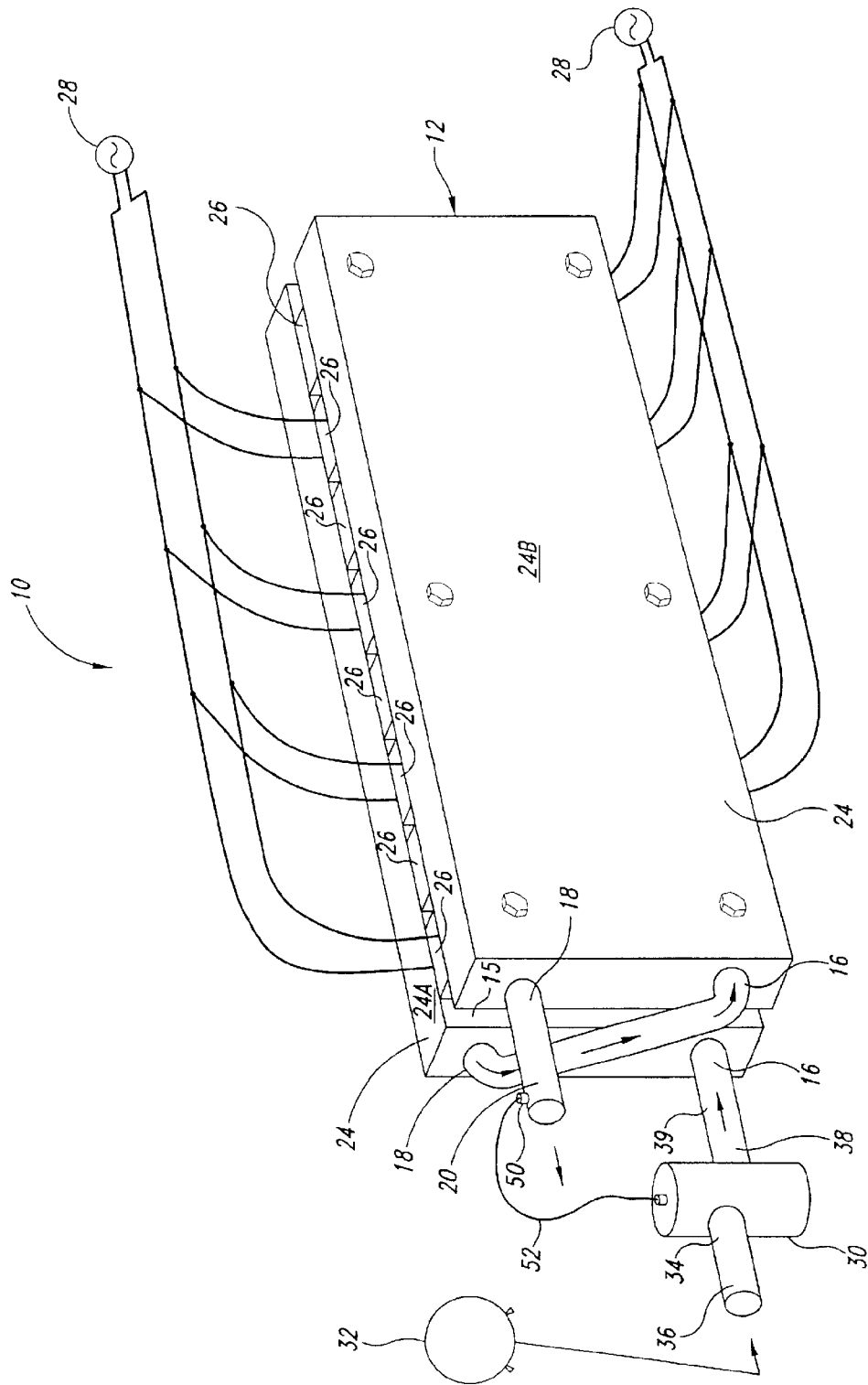
FIG. 1A is an isometric view of the vaporizer shown in FIG. 1 having a heat exchanger comprised of two stacked heat exchanger blocks and the capacity control valve.
Figure 1B:
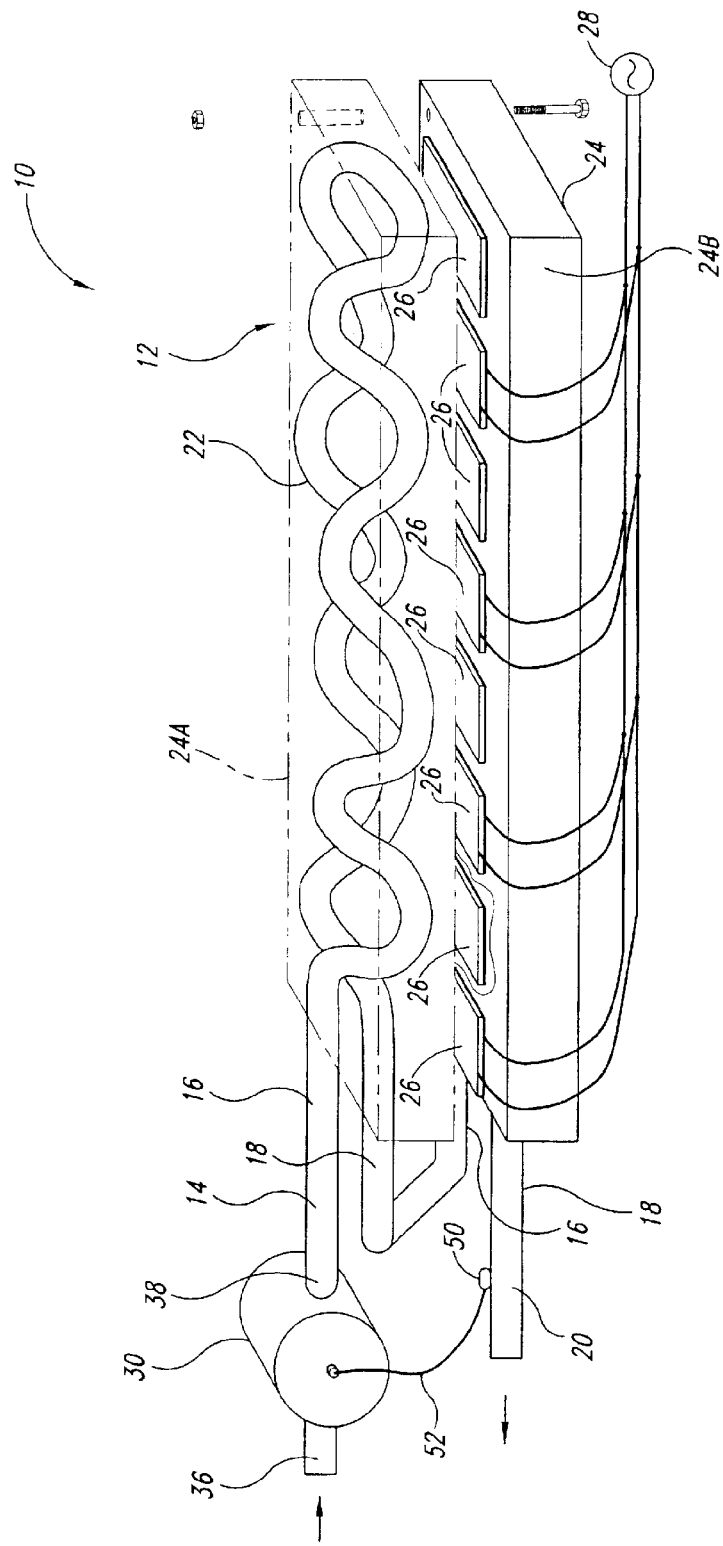
FIG. 1B is an isometric view of the vaporizer of FIG. 1A shown partially assembled with one to the heat exchanger blocks show in phantom line to better illustrate the vaporization tube encased therein.

The heat exchanger 12 includes an electric heater 26 positioned adjacent to the aluminum block 24 within which the vaporization tube 22 resides to supply heat to the vaporization tube and to thereby boil the liquefied gas entering the vaporization tube from the inlet 16 to a vapor state. The gas vapor rises within the vaporization tube 22 and exits the heat exchanger 12 via the outlet 18 and is carried away by the outlet tube 20. In one embodiment, the electric heater 26 comprises a plurality of positive temperature coefficient (PTC) heating elements placed flat against at least one face of the block 24, and in an embodiment utilizing two blocks, such as blocks 24A and 24B shown in FIGS. 1A and 1B, the PTC heating elements are sandwiched securely between the two blocks. The PTC heating elements are each connected in parallel with an electrical the power supply 28. The power supply 28 supplies electrical power at 110 to 240 volts to each of the PTC heating elements of the electric heater 26. Although an electric heater is illustrated, other heat sources may be used to supply the heat necessary for vaporization of the liquefied gas, such as steam or by-product heated exhaust gases. While a liquefied petroleum gas vaporizer is described herein, the vaporizer 10 of the present invention may be used for vaporizing other liquefied gases, such as ammonia.

The vaporizer 10 of the present invention includes a capacity control valve 30 coupled between a liquefied gas source 32, such as a liquefied petroleum gas storage tank, and the heat exchanger 12. The capacity control valve 30 includes a value inlet 34 connected to a liquefied gas inlet tube 36, which is coupled to and receives liquefied gas from the liquefied gas source 32. The capacity control valve 30 further includes a valve outlet 38 connected to the liquefied gas inlet tube 14, which extends to the inlet 16 of the heat exchanger 12. The capacity control valve 30 is constructed generally the same as a thermal expansion valve (TEX), such as commonly used in air conditioning systems. However, the capacity control valve 30 of the present invention is operated in reverse of the operation of a thermal expansion valve in an air conditioning system to perform a different function, as will be describe below.

The capacity control valve 30 includes a valve body 40 having a thermal expansion chamber 42, a liquefied gas inlet chamber 44 and a liquefied gas outlet chamber 46. A diaphragm 48 divides the thermal expansion chamber 42 from the liquefied gas inlet chamber 44. In the illustrated embodiment, the diaphragm is a flexible, thin metal disk of conventional design. A thermal sensing bulb 50 is positioned in thermal contact with the gas vapor outlet tube 20, which carries the vaporized gas from the heat exchanger, at a location reasonably close to the heat exchanger outlet 18. The thermal sensing bulb 50 is connected by a tube 52 to the thermal expansion chamber 42. When the vaporizer 10 is implemented for use with liquefied petroleum gas as being described herein, the sensing bulb 50 is charged with an expansion fluid 54 having saturation properties similar to those of liquefied petroleum gas. The tube 52 provides fluid communication of the fluid 54 between the sensing bulb 50 and the thermal expansion chamber 42. The sensing bulb 50 in an alternative embodiment may be replaced with a coiled tube or a pass-through tube bulb.

The diaphragm 48 is configured to respond to a pressure differential between the thermal expansion chamber 42 and the liquefied gas inlet chamber 44. At equilibrium, when the pressure in both chambers 42 and 44 is equal, the diaphragm 48 is balanced in an "at rest" position between the chambers 42 and 44. A pressure difference between the thermal expansion chamber 42 and the liquefied gas inlet chamber 44 causes the diaphragm 48 to move or flex into the one of the chambers 42 and 44 having the lesser pressure therein. The degree of expansion, i.e., the distance that the diaphragm 48 moves into the lower pressure chamber, is a function of the difference in pressure between the chambers 42 and 44: the greater the pressure differential, the farther the diaphragm 48 moves. Thus, the diaphragm 48 moves along a continuum that is infinitely variable in response to changes in the pressure differential between the thermal expansion chamber 42 and the liquefied gas inlet chamber 44.

The valve inlet 34 of the capacity control valve 30 supplies the liquefied gas carried by the liquefied gas inlet tube 36 to the liquefied gas inlet chamber 44. The valve outlet 38 discharges the liquefied gas in the liquefied gas outlet chamber 46 to the liquefied gas inlet tube 14 to supply the liquefied gas to the heat exchanger 12 for vaporization. An annular wall 56 with a central orifice 58 divides the liquefied gas inlet chamber 44 from the liquefied gas outlet chamber 46. A valve seat 60 is formed on an underside of the annular wall 56, about the orifice 58, and a valve 62 is positioned below the annular wall and is operatively movable between a fully closed position with the valve seating in the valve seat, and a fully open position with the valve moved downward, substantially away from the valve seat. The valve 62 is positionable at all positions between the fully closed and fully open positions, as will be described in greater detail below.

When the valve 62 is in the fully closed position, in seated arrangement with the valve seat 60, the valve blocks the flow of liquefied gas from the liquefied gas inlet chamber 44 into the liquefied gas outlet chamber 46, and hence blocks the flow of liquefied gas to the heat exchanger 12. As the valve 62 opens and moves downward progressively farther away from the valve seat 60, the flow of liquefied gas from the liquefied gas inlet chamber 44 into the liquefied gas outlet chamber 46 progressively increases, as does the flow of liquefied gas to the heat exchanger 12. As the open valve 62 moves upward progressively closer to the valve seat 60, the flow of liquefied gas from the liquefied gas inlet chamber 44 into the liquefied gas outlet chamber 46 progressively decreases, as does the flow of liquefied gas to the heat exchanger 12.

The movement of the valve 62 is principally controlled by the movement of the diaphragm 48 using a rigid valve stem 64, which couples the valve 62 to the diaphragm 48 for movement therewith. An upper end of the valve stem 64 is attached to a central portion of the diaphragm 48, and a lower end of the valve stem is attached to a central portion the valve 62. When a pressure differential exists between the thermal expansion chamber 42 and the liquefied gas inlet chamber 44, the diaphragm 48 moves toward the chamber with the lesser pressure therein, and the valve stem 64 causes the valve 62 to move in the same direction and by the same amount relative to the valve seat 60.

In operation, the movements of the diaphragm 48 open and close the valve 62 as the relative pressures of the liquefied gas in the liquefied gas inlet chamber 44 and the liquid 54 in the thermal expansion chamber 42 change. If the pressure $P_{BULB}$ of the liquid 54 in the thermal expansion chamber 42 should decrease, as a result of the sensing bulb 50 sensing the temperature of the gas vapor in the gas vapor outlet tube 20 decreasing, the diaphragm 48 will move upward into the thermal expansion chamber 42 and the valve stem 64 will drive the valve 62 upward. With sufficient upward movement the valve 62 will reach the fully closed position, with the valve seated in the valve seat 60 and the flow of liquefied gas to the heat exchanger 12 completely blocked. Of course, the direction and amount of movement of the valve 62 results from the amount and direction of the differential pressure experienced by the diaphragm 48. If the pressure $P_{IN}$ of the liquefied gas in the liquefied gas inlet chamber 44 should also increase or decrease, the valve 62 will move upward in a different amount, and could even move in the downward direction.

If the pressure $P_{BULB}$ of the liquid 54 in the thermal expansion chamber 42 should increase, as a result of the sensing bulb 50 sensing the temperature of the gas vapor in the gas vapor outlet tube 20 increasing, the diaphragm 48 will move downward into the liquefied gas inlet chamber 44 and the valve stem 64 will drive the valve 62 downward. With sufficient downward movement the valve 62 will reach the fully open position, with the valve spaced far from the valve seat 60 and the flow of liquefied gas to the heat exchanger 12 substantially uninhibited. The more the movement opens the valve 62, the larger the flow of liquefied gas to the heat exchanger. If the pressure $P_{IN}$ of the liquefied gas in the liquefied gas inlet chamber 44 should also increase or decrease, the valve 62 will move downward in a different amount. Again, the direction and amount of movement of the valve 62 results from the amount and direction of the differential pressure experienced by the diaphragm 48, the differential pressure being the difference between the pressure of the liquid 54 in the thermal expansion chamber 42 (which is dependent on the temperature of the gas vapor in the gas vapor outlet tube 20 being measured by the sensing bulb 50) and the pressure of the liquefied gas in the liquefied gas inlet chamber 44 (which is dependent on the pressure of the liquefied gas being supplied to the vaporizer 10 by the liquefied gas source 32).

The pressure of the liquefied gas in the liquefied gas inlet chamber 44 is the inlet pressure of the liquefied gas supplied to the vaporizer 10 by the liquefied gas source 32. This vaporizer inlet pressure changes with the conditions experienced by the liquefied gas source 32, such as the temperature of the source, and the vaporizer inlet pressure tends to follow the saturation pressure of the input gas. Thus, the capacity control valve 30 controls the input flow of liquefied gas to the heat exchanger 12 based upon both the temperature of the gas vapor in the gas vapor outlet tube 20 and the inlet pressure of the liquefied gas supplied to the vaporizer 10 by the liquefied gas source 32, unlike some prior art vaporizers which only controlled the input flow based upon the temperature of the gas vapor produced without concern for the inlet pressure of the liquefied gas being supplied to the vaporizer. As such, these prior art vaporizers do not adequately respond to the changing conditions of the liquefied gas input to the vaporizer.

As noted above, the amount and direction of the movement of the diaphragm 48, and hence the amount and direction of movement of the valve 62 and the amount of liquefied gas that the valve allows to flow through the capacity control valve 30 into the inlet tube 14 of the heat exchanger 12, are a function of the pressure differential between the thermal expansion chamber 42 and the liquefied gas inlet chamber 44. Accordingly, a pressure within the liquefied gas inlet chamber 44 that is greater than the pressure in the thermal expansion chamber 42 will cause the diaphragm 48 to move upward and the valve stem 64 to move the valve 62 toward the valve seat 60 and the fully closed position, thereby progressively reducing the flow of liquefied gas to the heat exchanger 12. Conversely, a pressure within the thermal expansion chamber 42 that is greater than the pressure of the liquefied gas inlet chamber 44 will cause the diaphragm 48 to move downward and the valve stem 64 to move the valve 62 away from the valve seat 60 and toward the fully open position, thereby progressively increasing the flow of liquefied gas to the heat exchanger 12. Preferably, the valve 62, the valve seat 60, and the valve stem 64 are configured in combination with the diaphragm 48 such that when at equilibrium, with the pressure across the diaphragm balanced and the diaphragm 48 in the "at rest" position, the valve 62 is at a distance away from the valve seat 60 such that the pressurized flow of liquefied gas passing through the capacity control valve 30 and into the heat exchanger 12 is at a predetermined flow rate selected to provide the desired rated output of gas vapor in the outlet tube 20 at a desired superheated temperature under normal operation of the vaporizer 10.

As discussed, the pressure differential across the diaphragm 48 is the difference between the inlet liquefied gas pressure $P_{IN}$ within the liquefied gas inlet chamber 44 and the pressure $P_{BULB}$ of the liquid 54 in the thermal expansion chamber 42. Change in the temperature of the gas vapor exiting the heat exchanger 12 through the outlet tube 20 is indicative of a change in the operating condition occurring inside the heat exchanger 12, with the liquid 54 within the sensing bulb 50 communicating that change of gas vapor temperature to the thermal expansion chamber 42. As noted above, the sensing bulb 50 is charged with a fluid having saturation properties similar to those of the liquefied gas for which the vaporizer 10 of the invention is implemented, such as liquid petroleum gas for the embodiment described herein. Similarly, a change in the condition experienced by the liquefied gas source 32 is communicated to the liquefied gas inlet chamber 44 via the valve inlet 34. In operation, the net result of these changes is movement of the diaphragm 48 and hence adjustment by the capacity control valve 30 of the liquefied gas supplied to the heat exchanger 12.

For example, assuming that the diaphragm 48 was in the "at rest" position and the valve 62 was in a correspondingly open position, if a condition occurs such that the temperature of the vaporized gas in the outlet tube 20 goes down, the liquid 54 in the sensing bulb 50 contracts and the pressure in the thermal expansion chamber 42 decreases. This might result because the heat exchanger 12 is receiving a larger flow of liquefied gas than the electric heater 26 can vaporize with the desired gas vapor temperature. Assuming that there is no change also occurring in the condition of the liquefied gas source 32, this will cause the valve 62 to move upward and reduce the flow of liquefied gas to the heat exchanger 12. As the flow of liquefied gas to the heat exchanger 12 decreases, the heat produced by the electric heater 26 will be transferred to the now smaller flow of liquefied gas into the vaporization tube 22. As a result, the temperature of the vaporized gas exiting the outlet 18 will begin to increase compared to the temperature of the vaporized gas the electric heater had been producing at the higher flow rate. As the temperature of the gas vapor in the outlet tube 20 sensed by the sensing bulb 50 rises, the liquid 54 will begin to expand and the pressure in the thermal expansion chamber 42 will increase. This will cause the valve 62 to move downward and further open the valve 62 to increase the flow of liquefied gas to the heat exchanger 12 until the flow rate through the vaporization tube 22 allows the electric heater 12 to produce gas vapor in the outlet tube 20 at the desired temperature.

This operation also insures that only gas vapor, and not liquefied gas flows out the outlet tube 20. Should the heat exchanger 12 start flooding with liquefied gas, the gas vapor being produced will become very saturated and its temperature will drop, thus moving the valve 62 toward the fully closed position and restricting or even cutting off the flow to and from the heat exchanger 12 until the temperature of the gas vapor in the outlet tube rises to the desired temperature. However, since the diaphragm 48 is responsive to the pressure $P_{IN}$ of the liquefied gas in the liquefied gas inlet chamber 44 (i.e., the inlet pressure of the liquefied gas supplied to the vaporizer 10 by the liquefied gas source 32), and not just the temperature of the gas vapor in the outlet tube 20, should a change in the inlet pressure be occurring at the same time, the operation of the capacity control valve 30 takes that into account. For example, if the inlet pressure is rising, the valve 12 will be closed even further, but if the inlet pressure is falling, the valve will not be closed as far, thereby producing overall better results than if only the temperature of the gas vapor in the outlet tube 20 was used to control the operation of the capacity control valve. Thus, the flow of liquefied gas into the heat exchanger 12 will be more accurately controlled to provide gas vapor at the desired temperature and the flow of liquefied gas into the heat exchanger 12 will not exceed the vaporization ability of the electric heater 26.

In contrast to the flooding condition just discussed, should gas vapor in the outlet tube 20 increase in the temperature beyond the desired superheated temperature, the liquid 54 in the sensing bulb 50 will expand and the pressure in the thermal expansion chamber 42 increase. This might result because the heat exchanger 12 is receiving a smaller flow of liquefied gas than the electric heater 26 can vaporize with the desired gas vapor temperature, thus overheating the gas that is vaporized. Assuming that there is no change also occurring in the condition of the liquefied gas source 32, this will cause the valve 62 to move downward and increase the flow of liquefied gas to the heat exchanger 12. As the flow of liquefied gas to the heat exchanger 12 increases, the heat produced by the electric heater 26 will be transferred to the now larger flow of liquefied gas into the vaporization tube 22. As a result, the temperature of the vaporized gas exiting the outlet 18 will begin to decrease compared to the excessive temperature of the vaporized gas the electric heater had been producing at the lower flow rate. As the temperature of the gas vapor in the outlet tube 20 sensed by the sensing bulb 50 lowers, the liquid 54 will begin to contract and the pressure in the thermal expansion chamber 42 will decrease. This will cause the valve 62 to move upward and further close the valve 62 to decrease the flow of liquefied gas to the heat exchanger 12 until the flow rate through the vaporization tube 22 allows the electric heater 12 to produce gas vapor in the outlet tube 20 at the desired temperature. As a result, the vaporizer 10 is self-regulating to always produce gas vapor at its maximum design capacity and at the desired temperature.

Again, since the diaphragm 48 is responsive to the pressure $P_{IN}$ of the liquefied gas in the liquefied gas inlet chamber 44 (i.e., the inlet pressure of the liquefied gas supplied to the vaporizer 10 by the liquefied gas source 32), and not just the temperature of the gas vapor in the outlet tube 20, should a change in the inlet pressure be occurring at the same time, the operation of the capacity control valve 30 takes that into account. For example, if the inlet pressure is falling, the valve 12 will be opened even further, but if the inlet pressure is rising, the valve will not be opened as far, thereby producing overall better results than if only the temperature of the gas vapor in the outlet tube 20 was used to control the operation of the capacity control valve. Thus, the flow of liquefied gas into the heat exchanger 12 will be more accurately controlled to provide gas vapor at the desired temperature.

The capacity control valve 30 includes a biasing spring 66 positioned between the valve 62 and an adjustment screw 68, to apply an upward biasing force or spring pressure $P_{SPR}$ on the valve tending to urge the valve toward the fully closed position. The biasing spring 66 is arranged directly below the valve 62, in coaxial alignment with the valve stem 64, and provides a resistance force against downward movement of the valve which must be overcome by the pressure $P_{BULB}$ of the liquid 54 in the thermal expansion chamber 42, in addition to the pressure $P_{IN}$ within the liquefied gas inlet chamber 44, to move the valve downward toward the fully open position. If the pressure $P_{BULB}$ of the liquid 54 in the thermal expansion chamber 42 minus the sum of the pressure $P_{IN}$ within the liquefied gas inlet chamber 44 and the spring pressure $P_{SPR}$ is greater than zero, then the valve 62 will open (i.e., if: $P_{BULB}-[P_{IN}+P_{SPR}]>0$, then the valve will open).

The adjustment screw 68 is located to engage and selectively adjustably move upward or downward the lower end of the biasing spring 66. This is accomplished by rotating the adjustment screw to threadably move it inward or outward to increase or decrease, respectively, the amount of upward force the biasing spring 66 applies to the valve, which sets the "at rest" position of the diaphragm 48, i.e., the position the diaphragm will assume if the pressure in both the chambers 42 and 44 is equal. The effect is to set the superheated temperature to which the heat exchanger 12 will heat the gas vapor in the outlet tube 20 under normal operation of the vaporizer 10. The capacity control valve 30 thus prevents liquefied gas (in the illustrated embodiment LPG liquid) carryover into outlet tube 20 by ensuring a minimum amount of superheat within the heat exchanger 12. If desired, in an alternative embodiment, the adjustment screw 68 can be deleted to provide a fixed superheat setting for the capacity control valve.

Figure 2:
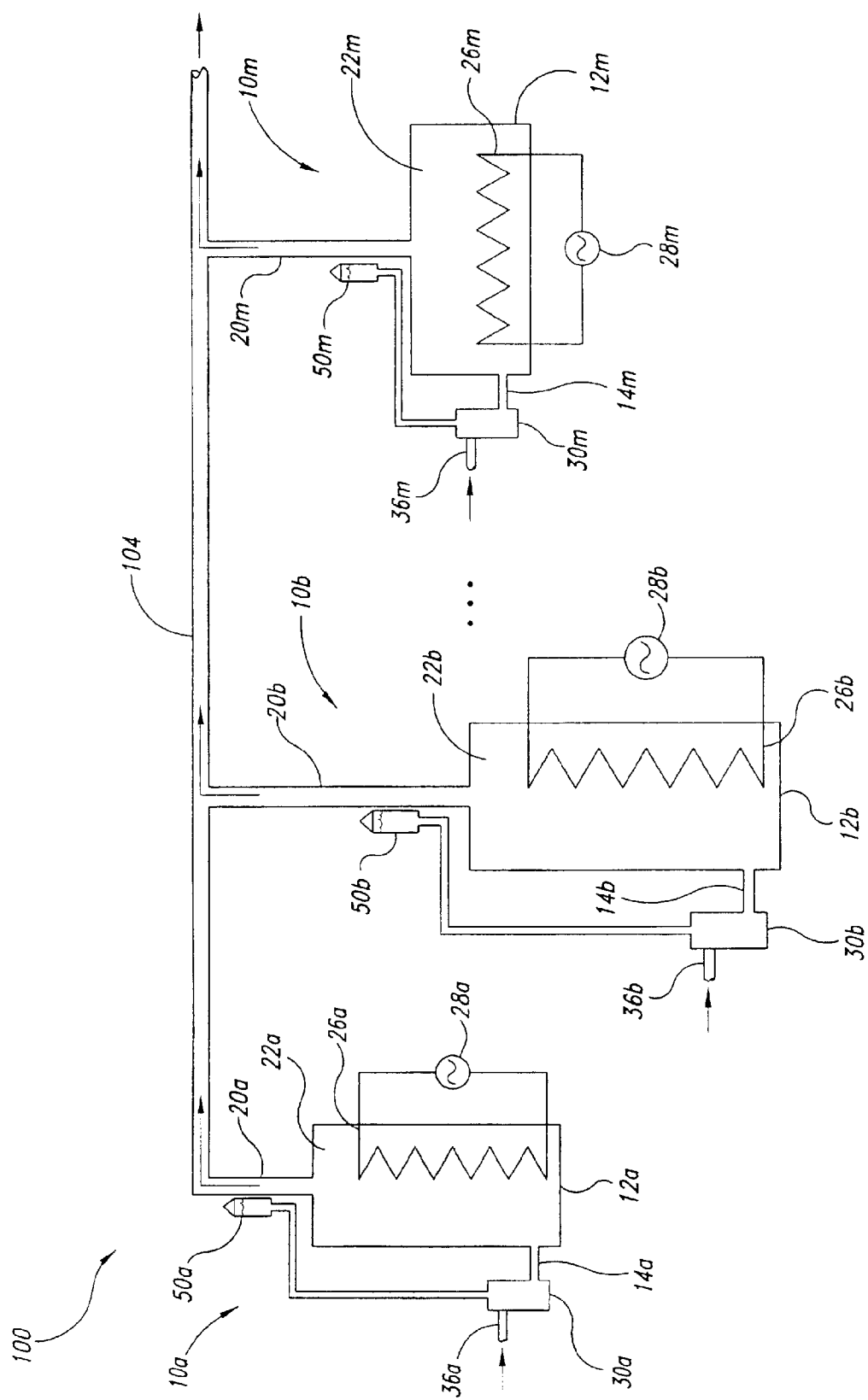
FIG. 2 is a schematic view of a multiple vaporizers system using the vaporizer shown in FIG. 1.

FIG. 2 illustrates a multiple vaporizer system 100 of the invention utilizing vaporizers 10a, 10b through 10m, each vaporizer being of the type described above with respect to the single vaporizer embodiment of FIG. 1. The vaporizers 10a through 10m are all connected and operate simultaneously to provide superheated gas vapor to a single outlet or manifold 104. Historically, two or more vaporizers feeding into a single outlet or manifold have required near perfect balance among the vaporizers to prevent one from being "favored" over the others, which can result in the others shutting down their operation. Balancing the multiple vaporizers required the vaporizers to have near identical sizing and configuration, and near identical elevation and placement relative to the manifold, which was not always possible in practice. By using the capacity control valve 30 of the present invention for each vaporizer of the multiple vaporizer system 100, these problems are overcome since there in no need for balancing the different vaporizers used in the system. The capacity control valve 30 of the invention ensures optimum performance from every vaporizer in the system independent of the operation of the other vaporizers. In effect, vaporizers using the capacity control valve 30 are self-balancing when used in a multiple vaporizer system.

The vaporizers 10a through 10m of the system 100 include respective heat exchangers 12a through 12m, each having a respective gas vapor outlet tubes 20a through 20m coupled into the single manifold 104. A capacity control valve 30a through 30m is coupled to the respective liquefied gas inlet tube 14a through 14m of each heat exchanger for controlling the input of liquefied gas into the heat exchanger 12a through 12m. A liquefied gas source, such as an LPG storage tank (not shown), supplies liquefied gas to a liquefied gas inlet tube 36a through 36m of each of the capacity control valves 30a through 30m. The capacity control valves each include a sensing bulb 50a through 50m thermally coupled to a respective gas vapor outlet tube 20a through 20m between the heat exchanger and the gas vapor manifold 104.

Optionally, the heat exchanger 12a through 12m of each vaporizer 10a through 10m of the system 100 may be at a different location, elevation and orientation relative to both the liquefied gas source and the gas vapor manifold 104. Furthermore, the liquefied gas inlet tubes 36a through 36m and the gas vapor outlet tubes 20a through 20m may be of different sizes and configurations if desired, and the system 100 will still operate properly.

As described above for the single vaporizer 10 of FIG. 1, the capacity control valves 30a through 30m operate to control the superheat of a corresponding one of the vaporizers 10a through 10m such that the vaporizer operates at maximum capacity, without suffering an overdraw condition. This operation will occur without regard to the presence or absence of additional vaporizers feeding gas vapor to the manifold 104. In other words, the capacity control valve of the invention permits multiple vaporizers to operate in parallel without regard for the size, elevation, configuration, etc. of the vaporizers used. The use of the temperature of the gas vapor outlet tube and the inlet pressure of the liquefied gas to control the capacity control valve of the individual vaporizer, effectively controls each vaporizer independent of and decoupled from the other vaporizers of the system 100, with each vaporizer being controlled to operate at its maximum capacity and desired gas vapor temperature, as described above for the single vaporizer embodiment of FIG. 1.

Figure 3:
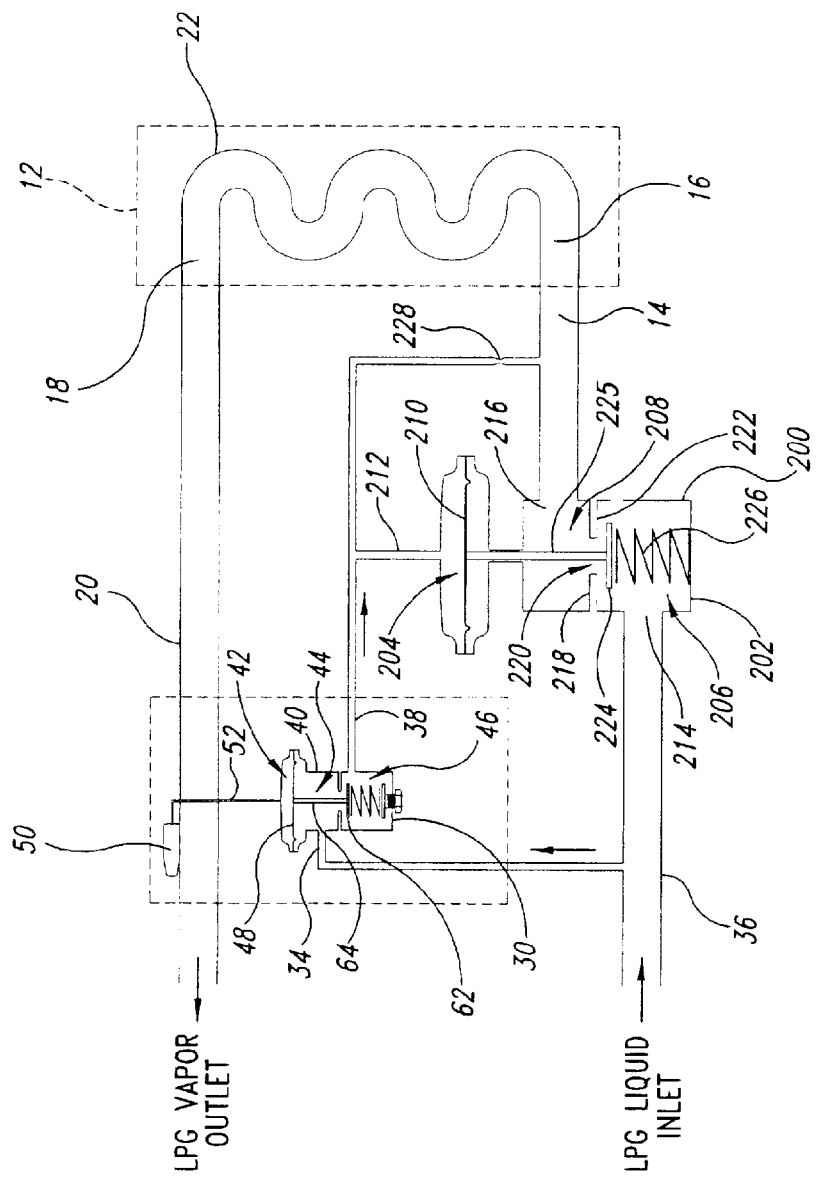
FIG. 3 is a schematic view of an embodiment of the vaporizer of the present invention having the capacity control valve used as a pilot for a larger inlet valve.

The capacity control valve 30 of the present invention may alternately be used as a pilot for larger valves with higher flow capacities. This is especially useful to achieve the same beneficial results described above for the capacity control valve 30 when the capacity control valve cannot handle the higher flow rate through its own valve body 40. In FIG. 3, the capacity control valve 30 is shown used to pilot a normally closed valve 200 used as an inlet valve and having a similar construction to the capacity control valve 30.

The normally closed valve 200 includes a valve body 202 having an expansion chamber 204, an inlet chamber 206 and an outlet chamber 208. A diaphragm 210 divides the expansion chamber 204 from an atmospheric reference. In the illustrated embodiment, the diaphragm is a flexible, elastomer disk of conventional design. A tube 212 communicates with the expansion chamber 204. A valve inlet 214 communicates with the inlet chamber 204 of the normally closed valve 200, and a valve outlet 216 communicates with the outlet chamber 208 of the normally closed valve. The diaphragm 210 is configured to respond to a pressure differential between the expansion chamber 204 and the atmospheric reference.

An annular wall 218 with a central orifice 220 divides the inlet chamber 206 from the outlet chamber 208. A valve seat 222 is formed on an underside of the annular wall 218, about the orifice 220, and a valve 224 is positioned below the annular wall and is operatively movable between a fully closed position with the valve seating in the valve seat, and a fully open position with the valve moved downward, substantially away from the valve seat. A rigid valve stem 225 couples the valve 224 to the diaphragm 210 for movement therewith. The valve 224 is positionable at all positions between the fully closed and fully open positions. The liquefied gas inlet tube 36, which supplies liquefied gas from the liquefied gas source 32, is connected to both the valve inlet 34 of the capacity control valve 30 and the valve inlet 214 of the normally closed valve 200. The valve outlet 38 of the capacity control valve 30 is connected to the tube 212 leading to the expansion chamber 204 of the normally closed valve 200. The valve outlet 216 of the normally closed valve 200 is connected to the liquefied gas inlet tube 14, which is connected to the inlet 16 of the heat exchanger 12.

When the valve 224 is in the fully closed position, in seated arrangement with the valve seat 222, the normally closed valve 200 blocks the flow of liquefied gas from the inlet chamber 206 into the outlet chamber 208, and hence blocks the flow of liquefied gas from the liquefied gas inlet tube 36 to the heat exchanger 12. As the valve 224 opens and moves downward progressively farther away from the valve seat 222, the flow of liquefied gas from the inlet chamber 206 into the outlet chamber 208 progressively increases, as does the flow of liquefied gas to the heat exchanger 12. As the open valve 224 moves upward progressively closer to the valve seat 222, the flow of liquefied gas from the inlet chamber 206 into the outlet chamber 208 progressively decreases, as does the flow of liquefied gas to the heat exchanger 12. A biasing spring 226 is positioned with respect to the valve 224 to apply an upward biasing, valve closing force on the valve 224 tending to urge the valve toward the fully closed position. The valve 224 of the normally closed valve 200 is normally in the fully closed position as a result of the biasing spring 226, unless the pressure in the expansion chamber 204 is greater than the biasing pressure applied by the biasing spring 226, in which case the valve 224 is moved downward toward the fully open position.

The capacity control valve 30 used in the embodiment of FIG. 3 operates much like the capacity control valve 30 described above for the single vaporizer use shown in FIG. 1. The valve 62 of the capacity control valve 30 is moved based on the differential pressure experienced by the diaphragm 48 with the diaphragm motion responsive to the pressure in the thermal expansion chamber 42, which is dependent on the temperature of the gas vapor in the gas vapor outlet tube 20 being measured by the sensing bulb 50, and the pressure in the liquefied gas inlet chamber 44, which is dependent on the pressure of the liquefied gas being supplied to the vaporizer by the liquefied gas source 32. As noted, instead of the valve outlet 38 of the capacity control valve 30 being connected directly to the inlet 16 of the heat exchanger 12, it is connected via the tube 212 to the expansion chamber 204 of the normally closed valve 200 and thereby supplies the pressure in the expansion chamber 212 of the normally closed valve 200 to control its opening.

The pressure in the expansion chamber 204 of the normally closed valve 200 supplied by the capacity control valve 30 is balanced by the diaphragm 210 of the normally closed valve against the pressure of the biasing spring 226 of the normally closed valve, and much like the capacity control valve 30 used in the embodiment of FIG. 1, thereby regulates the inlet flow of liquefied gas to the heat exchanger 12 to achieve substantially the same benefits. For example, when the normally closed valve 200 is closed but conditions cause the valve 62 of the capacity control valve 30 to move toward the fully open position because of a need to supply more liquefied gas to the heat exchanger 12, the valve outlet 38 of the capacity control valve supplies pressure to the expansion chamber 204 of the normally closed valve 200, causing the diaphragm 210 of the normally closed valve to move downward and the valve 224 of the normally closed valve to open, thus allowing the liquefied gas in the liquefied gas inlet tube 36 to flow to the inlet 16 of the heat exchanger 12. The required flow to the heat exchanger 12 passes through the normally closed valve 200 without having to pass through the capacity control valve 30. The inlet flow that the vaporizer system of FIG. 3 can handle is larger since the normally closed valve 200 has a larger flow capacity than the capacity control valve 30. The valve outlet 38 of the capacity control valve 30 is also connected through a bleed restrictor 228 to the liquefied gas inlet tube 14.

When the capacity control valve 30 of FIG. 3 closes as a result of reduction of the temperature in the gas vapor outlet tube 20 sensed by the sensing bulb 50 indicating a need to restrict the flow of liquefied gas to the heat exchanger 12, the pressure on the valve outlet 38 of the capacity control valve which is supplied to the expansion chamber 204 of the normally closed valve 200 goes to zero and the valve 224 of the normally closed valve closes.

Figure 4:
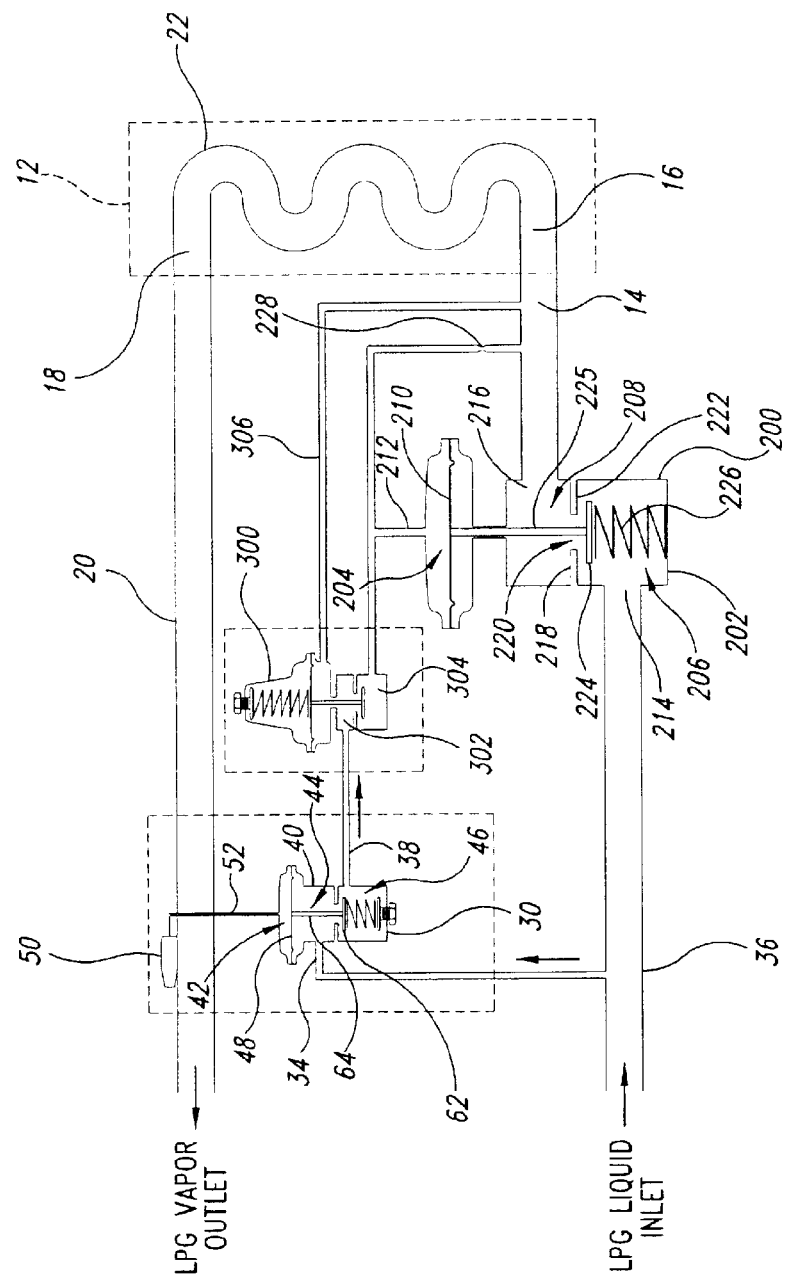
FIG. 4 is a schematic view of an embodiment of the vaporizer of the present invention having the capacity control valve used as a pilot for a larger inlet valve and incorporating a regulator.

A similar arrangement is shown in FIG. 4, except that this embodiment has the capacity control valve 30 connected through an inlet regulator 300 to the normally closed valve 200. The valve outlet 38 of the capacity control valve 30 is connected to an inlet chamber 302 of the regulator 300. An outlet chamber 304 of the regulator 300 is connected to the tube 212 leading to the expansion chamber 204 of the normally closed valve 200. Regulator 300 is also connected via a sensing tube 306 to the liquefied gas inlet tube 14 at a location close to the inlet 16 of the heat exchanger 12.

The capacity control valve 30 used in the embodiment of FIG. 4 operates much like the capacity control valve 30 described above for the single vaporizer use shown in FIG. 1, with the valve 62 being moved based on the differential pressure experienced by the diaphragm 48 with the diaphragm motion responsive to the pressure in the thermal expansion chamber 42, which is dependent on the temperature of the gas vapor in the gas vapor outlet tube 20 being measured by the sensing bulb 50, and the pressure in the liquefied gas inlet chamber 44, which is dependent on the pressure of the liquefied gas being supplied to the vaporizer by the liquefied gas source 32. As noted, instead of the valve outlet 38 of the capacity control valve 30 being connected directly to the inlet 16 of the heat exchanger 12, it is connected to the inlet chamber 302 of the regulator 300 and the outlet chamber 304 of the regulator 300 is connected via the tube 212 to the expansion chamber 204 of the normally closed valve 200 and thereby supplies the pressure in the expansion chamber 204 of the normally closed valve to control its opening.

The pressure in the expansion chamber 204 of the normally closed valve 200 supplied by the capacity control valve 30 via the regulator 300, is balanced by the diaphragm 210 of the normally closed valve against the pressure of the biasing spring of the normally closed valve, and much like the capacity control valve 30 used in the embodiment of FIG. 1, thereby regulates the inlet flow of liquefied gas to the heat exchanger 12 to achieve substantially the same benefits. For example, when the normally closed valve 200 is closed but conditions cause the valve 62 of the capacity control valve 30 to move toward the fully open position because of a need to supply more liquefied gas to the heat exchanger 12, the valve outlet 38 of the capacity control valve supplies pressure to the inlet chamber 302 of the regulator 300 and the regulator thereby supplies a regulated pressure at the set point pressure to the expansion chamber 204 of the normally closed valve 200, causing the diaphragm 210 of the normally closed valve to move downward and the valve 224 of the normally closed valve to open. This allows the liquefied gas in the liquefied gas inlet tube 36 to flow to the inlet 16 of the heat exchanger 12. The required flow to the heat exchanger 12 passes through the normally closed valve 200 without having to pass through the smaller capacity control valve 30. The inlet flow that the vaporizer system of FIG. 4 can handle is larger since the normally closed valve 200 has a larger flow capacity than the capacity control valve 30. The outlet chamber 304 of the regulator 300 is also connected through the bleed restrictor 228 to the liquefied gas inlet tube 14 at a location close to the inlet 16 of the heat exchanger 12.

With the capacity control valve 30 open and the normally closed valve 200 open, the regulated pressure in the expansion chamber 204 of the normally closed valve is balanced by the diaphragm 210 of the normally closed valve against the pressure of the biasing spring of the normally closed valve, and much like the capacity control valve 30 used in the embodiment of FIG. 1, thereby regulates the inlet flow of liquefied gas to the inlet 16 of the heat exchanger 12.

When the capacity control valve 30 of FIG. 4 closes as a result of reduction of the temperature in the gas vapor outlet tube 20 sensed by the sensing bulb 50 indicating a need to restrict the flow of liquefied gas to the heat exchanger 12, the pressure on the valve outlet 38 of the capacity control valve which is supplied to the inlet chamber 302 of the regulator 300 goes to zero and the regulator ceases supplying the regulated pressure to the expansion chamber 204 of the normally closed valve 200, thus closing the valve 224 of the normally closed valve.

Figure 5:
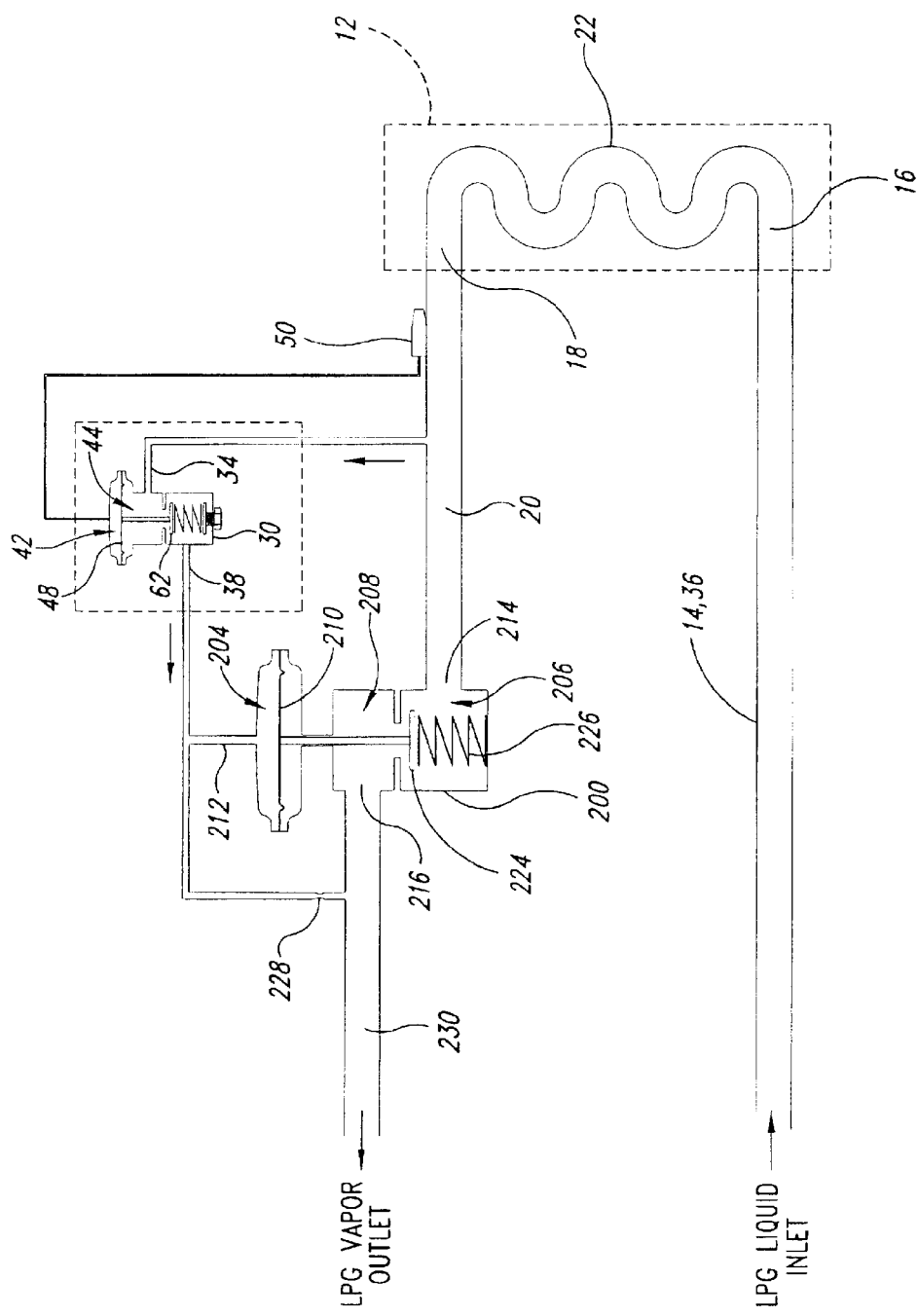
FIG. 5 is a schematic view of an embodiment of the vaporizer of the present invention having the capacity control valve used as a pilot for a larger outlet valve.

In FIG. 5, the capacity control valve 30 is shown used to pilot the normally closed valve 200 used as an outlet valve. The gas vapor outlet tube 20, which carries the gas vapor from the heat exchanger 12, is connected to both the valve inlet 34 of the capacity control valve 30 and the valve inlet 214 of the normally closed valve 200. The valve inlet 34 of the capacity control valve 30 used in the embodiment of FIG. 5 communicates the pressure in the gas vapor outlet tube 20 to the inlet chamber 44 of the capacity control valve, rather than liquefied gas as is the case with the embodiments of FIGS. 1–4, hence the inlet chamber will be referred to as the gas vapor inlet chamber 44, rather than the liquefied gas inlet chamber. Similarly, the outlet chamber 46 of the capacity control valve 30 will be referred to as the gas vapor outlet chamber rather than the liquefied gas outlet chamber as was the case with the embodiments of FIGS. 1–4. The valve outlet 38 of the capacity control valve 30 is connected to the tube 212 leading to the expansion chamber 204 of the normally closed valve 200. The valve outlet 216 of the normally closed valve 200 is connected to a gas vapor outlet tube 230 of the vaporizer 10.

When the valve 224 is in the fully closed position, in seated arrangement with the valve seat 222, the normally closed valve 200 blocks the flow of gas vapor from the inlet chamber 206 into the outlet chamber 208, and hence blocks the flow of gas vapor from the outlet 18 of the heat exchanger 12. Of course, if the flow of gas vapor out of the heat exchanger 12 is blocked, there will be substantially no flow of liquefied gas from the liquefied gas inlet tube 36 to the inlet 16 of the heat exchanger. As the valve 224 opens and moves downward progressively farther away from the valve seat 222, the flow of gas vapor from the inlet chamber 206 into the outlet chamber 208 progressively increases, as does the flow of liquefied gas to the heat exchanger 12. As the open valve 224 moves upward progressively closer to the valve seat 222, the flow of gas vapor from the inlet chamber 206 into the outlet chamber 208 progressively decreases, as does the flow of liquefied gas to the heat exchanger 12.

In the embodiment of FIG. 5, as in other embodiments, the sensing bulb 50 of the capacity control valve 30 is positioned in thermal contact with the gas vapor outlet tube 20 at a location reasonably close to the heat exchanger outlet 18, and the capacity control valve operates much like the capacity control valve described above for the single vaporizer use shown in FIG. 1. The valve 62 of the capacity control valve 30 is moved based on the differential pressure experienced by the diaphragm 48 with the diaphragm motion responsive to the pressure in the thermal expansion chamber 42, which is dependent on the temperature of the gas vapor in the gas vapor outlet tube 20 being measured by the sensing bulb 50, and the pressure in the inlet chamber 44, which in the embodiment of FIG. 5 is dependent on the pressure of the gas vapor being produced by the heat exchanger 12. As noted, in the embodiment of FIG. 5, the valve outlet 38 of the capacity control valve 30 is connected via the tube 212 to the expansion chamber 204 of the normally closed valve 200 and thereby supplies the pressure in the expansion chamber 204 of the normally closed valve to control its opening.

The pressure in the expansion chamber 204 of the normally closed valve 200 supplied by the capacity control valve 30 is balanced by the diaphragm 210 of the normally closed valve against the pressure of the biasing spring 226 of the normally closed valve 200, thereby regulates the outlet flow of gas vapor from the heat exchanger 12 and thus the inlet flow of liquefied gas to the heat exchanger, to achieve substantially the same benefits as with the embodiments of FIGS. 1 and 3. For example, when the normally closed valve 200 is closed but conditions cause the valve 62 of the capacity control valve 30 to move toward the fully open position because of a need to supply more liquefied gas to the heat exchanger 12, the valve outlet 38 of the capacity control valve supplies pressure to the thermal expansion chamber 204 of the normally closed valve 200, causing the diaphragm 210 of the normally closed valve to move downward and the valve 224 of the normally closed valve to open, thus allowing the gas vapor to flow from the heat exchanger outlet 18 and the liquefied gas in the liquefied gas inlet tube 36 to flow to the heat exchanger inlet 16. The required flow to the heat exchanger 12 passes through the normally closed valve 200 without having to pass through the capacity control valve 30. The inlet flow that the vaporizer system of FIG. 5 can handle is larger since the normally closed valve 200 has a larger flow capacity than the capacity control valve 30. The valve outlet 38 of the capacity control valve 30 is also connected through a bleed restrictor 228 to the gas vapor outlet tube 230 downstream of the normally closed valve 200.

When the capacity control valve 30 of FIG. 5 closes as a result of reduction of the temperature in the gas vapor outlet tube 20 sensed by the sensing bulb 50 indicating a need to restrict the flow of liquefied gas to the heat exchanger 12, the pressure on the valve outlet 38 of the capacity control valve which is supplied to the thermal expansion chamber 204 of the normally closed valve 200 goes to zero and the valve 224 of the normally closed valve closes, which as described above, blocks the flow of gas vapor from the heat exchanger outlet 18 and the flow of liquefied gas to the heat exchanger inlet 16.

Figure 6:
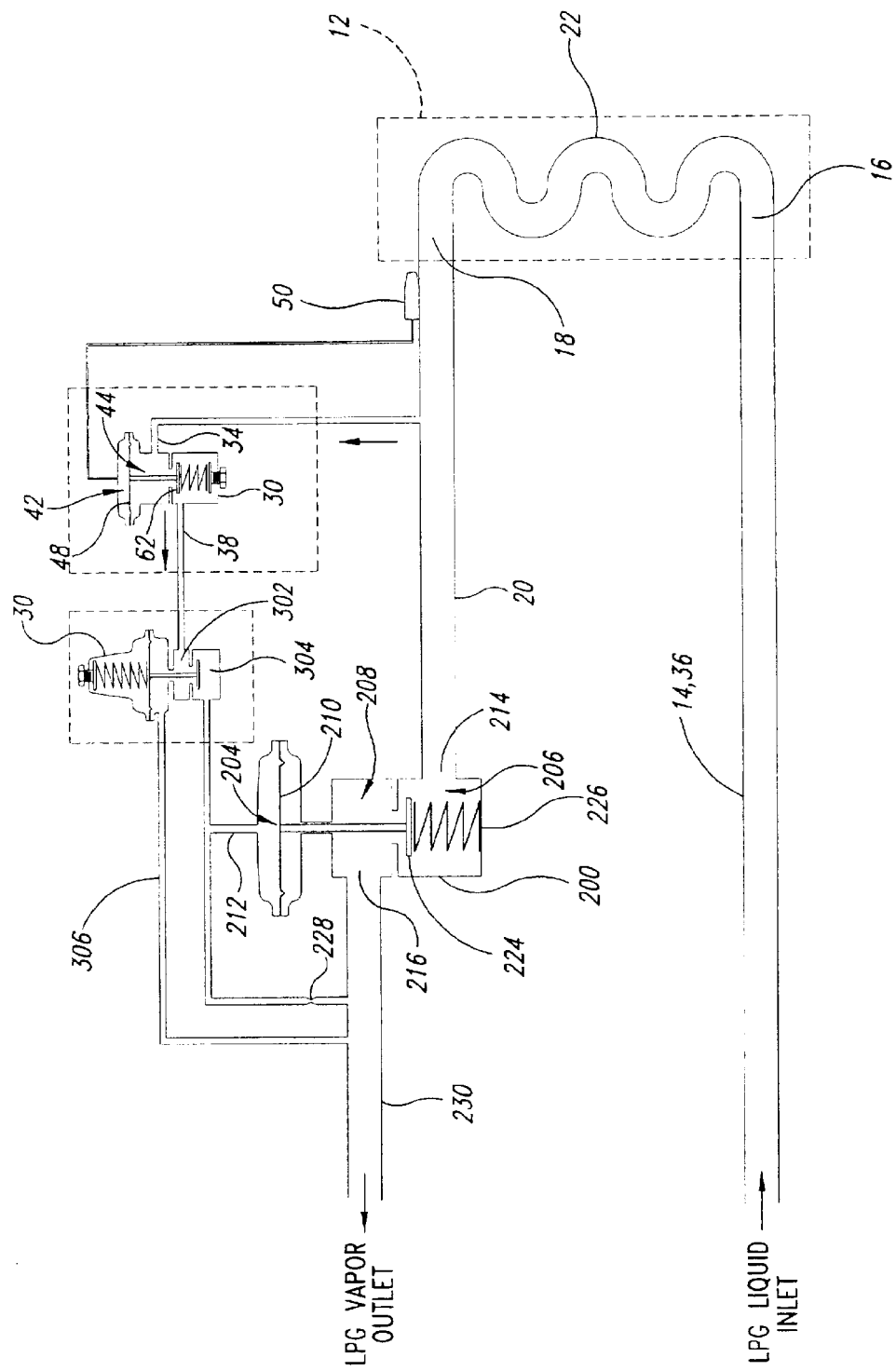
FIG. 6 is a schematic view of an embodiment of the vaporizer of the present invention having the capacity control valve used as a pilot for a larger outlet valve and incorporating a regulator.

A similar arrangement is shown in FIG. 6 with the capacity control valve 30 arranged to pilot the normally closed valve 200 when used as an outlet valve, except that as in the embodiment of FIG. 4 described above, this embodiment has the capacity control valve 30 connected through the outlet regulator 300 to the normally closed valve 200. The valve outlet 38 of the capacity control valve 30 is connected to the inlet chamber 302 of the regulator 300. The outlet chamber 304 of the regulator 300 is connected to the tube 212 leading to the expansion chamber 204 of the normally closed valve 200. The regulator 300 is also connected via a sensing tube 306 to the gas vapor outlet tube 230 downstream of the normally closed valve 200.

The capacity control valve 30 used in the embodiment of FIG. 6 operates much like the capacity control valve 30 described above for the single vaporizer use shown in FIG. 1 and even more so the vaporizer shown in FIG. 5, with the valve 62 being moved based on the differential pressure experienced by the diaphragm 48 with the diaphragm motion responsive to the pressure in the thermal expansion chamber 42, which is dependent on the temperature of the gas vapor in the gas vapor outlet tube 20 being measured by the sensing bulb 50, and the pressure in the inlet chamber 44, which is dependent on the pressure of the gas vapor being produced by the heat exchanger 12. As noted, the valve outlet 38 of the capacity control valve 30 is connected to the inlet chamber 302 of the regulator 300 and the outlet chamber 304 of the regulator 300 is connected via the tube 212 to the expansion chamber 204 of the normally closed valve 200 and thereby supplies the pressure in the expansion chamber 204 of the normally closed valve to control its opening.

The pressure in the expansion chamber 204 of the normally closed valve 200 supplied by the capacity control valve 30 via the regulator 300, is balanced by the diaphragm 210 of the normally closed valve against the pressure of the biasing spring of the normally closed valve, thereby regulates the outlet flow of gas vapor from the heat exchanger 12 and thus the inlet flow of liquefied gas to the heat exchanger, to achieve substantially the same benefits as with the embodiments of FIGS. 1, 3 and 4. For example, when the normally closed valve 200 is closed but conditions cause the valve 62 of the capacity control valve 30 to move toward the fully open position because of a need to supply more liquefied gas to the heat exchanger 12, the valve outlet 38 of the capacity control valve supplies pressure to the inlet chamber 302 of the regulator 300 and the regulator thereby supplies a regulated pressure at the set point pressure to the expansion chamber 204 of the normally closed valve 200, causing the diaphragm 210 of the normally closed valve to move downward and the valve 224 of the normally closed valve to open. This allows the gas vapor to flow from the heat exchanger outlet 18 and the liquefied gas in the liquefied gas inlet tube 36 to flow to the heat exchanger inlet 16. The required flow to the heat exchanger 12 passes through the normally closed valve 200 without having to pass through the capacity control valve 30. The inlet flow that the vaporizer system of FIG. 6 can handle is larger since the normally closed valve 200 has a larger flow capacity than the capacity control valve 30. The outlet chamber 304 of the regulator 300 is also connected through the bleed restrictor 228 to the gas vapor outlet tube 230 downstream of the normally closed valve 200.

With the capacity control valve 30 open and the normally closed valve 200 open, the regulated pressure in the expansion chamber 204 of the normally closed valve is balanced by the diaphragm 210 of the normally closed valve against the pressure of the biasing spring of the normally closed valve, and much like the capacity control valve 30 used in the embodiment of FIG. 1, thereby regulates gas vapor outlet flow of the heat exchanger outlet 18 and the inlet flow of liquefied gas to the heat exchanger inlet 16.

When the capacity control valve 30 of FIG. 6 closes as a result of reduction of the temperature in the gas vapor outlet tube 20 sensed by the sensing bulb 50 indicating a need to restrict the flow of liquefied gas to the heat exchanger 12, the pressure on the valve outlet 38 of the capacity control valve which is supplied to the inlet chamber 302 of the regulator 300 goes to zero and the regulator ceases supplying the regulated pressure to the expansion chamber 204 of the normally closed valve 200, thus closing the valve 224 of the normally closed valve, which as described above, blocks the flow of gas vapor from the heat exchanger outlet 18 and the flow of liquefied gas to the heat exchanger inlet 16.

Figure 7:
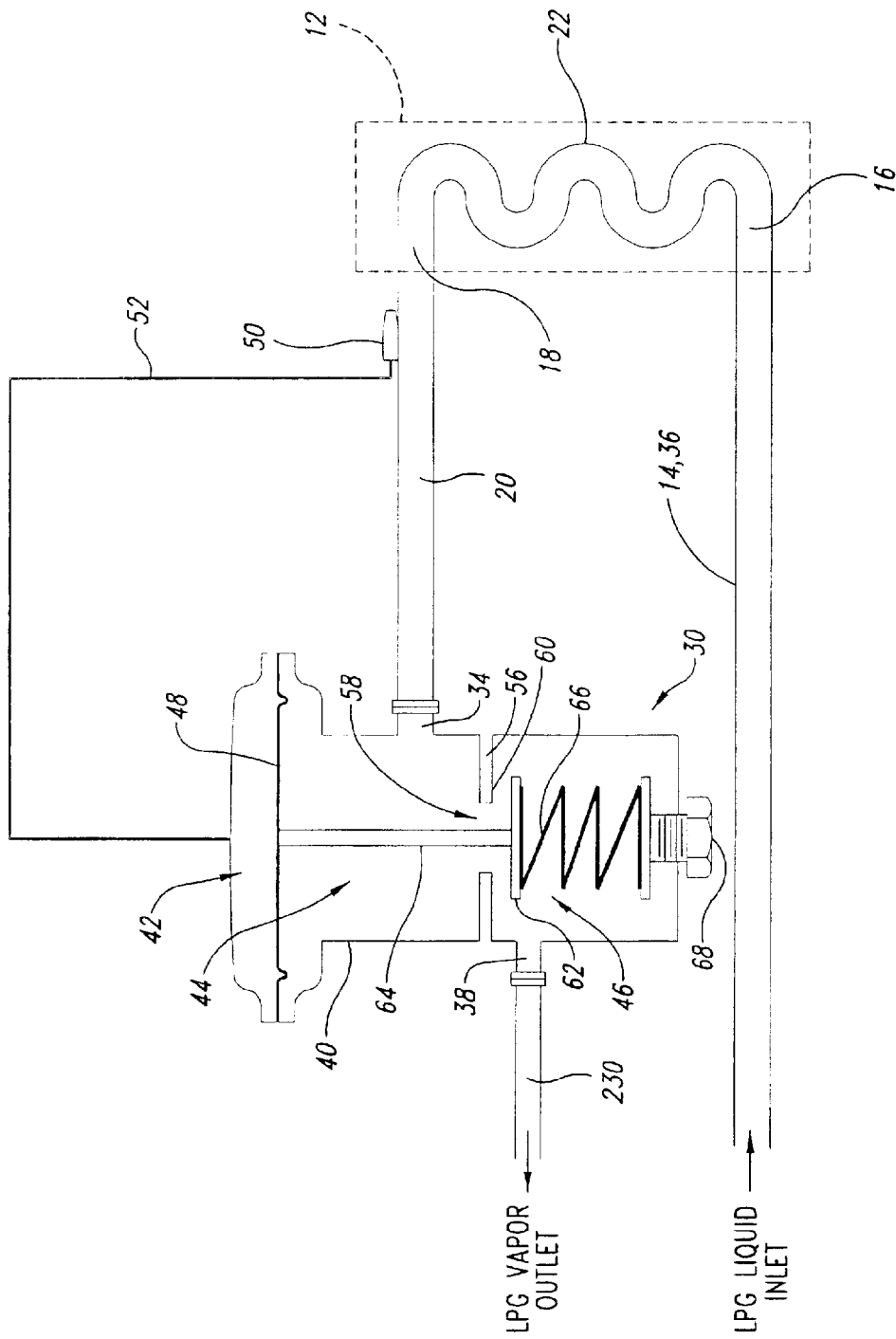
FIG. 7 is a schematic view of an embodiment of the vaporizer of the present invention having the capacity control valve used at the outlet of the heat exchanger.

Another embodiment of the invention very similar to the embodiment of FIG. 1 is shown in FIG. 7. In the embodiment of FIG. 7, the capacity control valve 30 is shown with its valve inlet 34 connected to the gas vapor outlet tube 20, which carries the gas vapor from the heat exchanger 12, and with its valve outlet 38 connected to the gas vapor outlet tube 230 of the vaporizer 10. The valve inlet 34 of the capacity control valve 30 communicates the pressure in the gas vapor outlet tube 20 to the inlet chamber 44 of the capacity control valve, rather than liquefied gas as is the case with the embodiment of FIG. 1, hence the inlet chamber will be referred to as the gas vapor inlet chamber 44, rather than the liquefied gas inlet chamber. Similarly, the outlet chamber 46 of the capacity control valve 30 will be referred to as the gas vapor outlet chamber rather than the liquefied gas outlet chamber as was the case with the embodiment of FIG. 1.

When the valve 62 is in the fully closed position, in seated arrangement with the valve seat 60, the valve blocks the flow of gas vapor from the gas vapor inlet chamber 44 into the gas vapor outlet chamber 46, and hence blocks the flow of gas vapor from the outlet 18 of the heat exchanger 12. Of course, if the flow of gas vapor out of the heat exchanger 12 is blocked, there will be substantially no flow of liquefied gas from the liquefied gas inlet tube 36 to the inlet 16 of the heat exchanger. As the valve 62 opens and moves downward progressively farther away from the valve seat 60, the flow of gas vapor from the gas vapor inlet chamber 44 into the gas vapor outlet chamber 46 progressively increases, as does the flow of liquefied gas to the heat exchanger 12. As the open valve 62 moves upward progressively closer to the valve seat 60, the flow of gas vapor from the gas vapor inlet chamber 44 into the gas vapor outlet chamber 46 progressively decreases, as does the flow of liquefied gas to the heat exchanger 12.

As in other embodiments, the sensing bulb 50 of the capacity control valve 30 is positioned in thermal contact with the gas vapor outlet tube 20 at a location reasonably close to the heat exchanger outlet 18, upstream from the valve inlet 34 in the embodiment of FIG. 7. The capacity control valve 30 operates much like the capacity control valve described above for the embodiment of FIG. 1 with the valve 62 of the capacity control valve 30 moving based on the differential pressure experienced by the diaphragm 48, and the diaphragm motion responsive to the pressure in the thermal expansion chamber 42 balanced against the gas vapor pressure in the gas vapor inlet chamber 44. As described above, the pressure in the thermal expansion chamber 42 is dependent on the temperature of the gas vapor in the gas vapor outlet tube 20 being measured by the sensing bulb 50, and the pressure in the gas vapor inlet chamber 44, which in the embodiment of FIG. 7 is dependent on the pressure of the gas vapor being produced by the heat exchanger 12.

The capacity control valve 30 of FIG. 7 regulates the outlet flow of gas vapor from the heat exchanger 12 and thus the inlet flow of liquefied gas to the heat exchanger, to achieve substantially the same benefits as with the embodiment of FIG. 1. For example, when conditions cause the valve 62 of the capacity control valve 30 to move toward the fully open position because of a need to supply more liquefied gas to the heat exchanger 12, the valve outlet 38 of the capacity control valve allow the gas vapor to flow from the heat exchanger outlet 18 and the liquefied gas in the liquefied gas inlet tube 36 to flow to the heat exchanger inlet 16. When the capacity control valve 30 of FIG. 7 closes as a result of reduction of the temperature in the gas vapor outlet tube 20 sensed by the sensing bulb 50 indicating a need to restrict the flow of liquefied gas to the heat exchanger 12, the valve 62 of the capacity control valve closes, which as described above, blocks the flow of gas vapor from the heat exchanger outlet 18 and the flow of liquefied gas to the heat exchanger inlet 16. From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A vaporizer for vaporizing a liquefied gas supplied by a source of liquefied gas, the vaporizer comprising:
  a heat exchanger having an inlet structured to accept liquefied gas, a heater to boil and superheat the accepted liquefied gas to a gas vapor, and an outlet structured to release the gas vapor; and
  a capacity control valve having:
    a valve body with a thermal expansion chamber, a liquefied gas inlet chamber and a liquefied gas outlet chamber,
    a diaphragm within the valve body dividing the thermal expansion chamber from the liquefied gas inlet chamber, the diaphragm being movable in response to a pressure imbalance in the thermal expansion chamber and the liquefied gas inlet chamber,
    a temperature sensing member positioned to sense the temperature of the released gas vapor from the heat exchanger outlet and having an expansion fluid therein in fluid communication with the thermal expansion chamber,
    a valve inlet in fluid communication with the liquefied gas inlet chamber and structured to be coupled to and accept the liquefied gas supplied by the source of liquefied gas,
    a valve outlet in fluid communication with the liquefied gas outlet chamber and connected to the heat exchanger inlet, and
    a valve positioned between the liquefied gas inlet chamber and the liquefied gas outlet chamber, the valve being movable toward a closed configuration to reduce the flow of liquefied gas from the liquefied gas inlet chamber to the liquefied gas outlet chamber and toward an open configuration to increase the flow of liquefied gas from the liquefied gas inlet chamber to the liquefied gas outlet chamber, the valve being moved toward the closed and open configurations in response to movements of the diaphragm resulting from the differential pressure in the thermal expansion chamber and the liquefied gas inlet chamber, with the pressure in the thermal expansion chamber being dependent on the sensed temperature of the released gas vapor from the heat exchanger outlet and the pressure in the liquefied gas inlet chamber being dependent on the pressure of the liquefied gas supplied by the source of liquefied gas.

2. The vaporizer of claim 1, wherein the valve is movable fully to the closed configuration and to the open configuration.

3. The vaporizer of claim 1 wherein the temperature sensing member is a sensing bulb thermally coupled to the heat exchanger outlet and the expansion fluid is communicated to the thermal expansion chamber by a tube in fluid communication with the thermal expansion chamber.

4. The vaporizer of claim 1 wherein the expansion fluid is selected to have saturation properties similar to saturation properties of the liquefied gas supplied by the source of liquefied gas.

5. The vaporizer of claim 1 wherein the capacity control valve further includes an auxiliary pressure device producing a biasing pressure on the valve to bias the valve toward the closed configuration.

6. The vaporizer of claim 5 wherein the auxiliary pressure device has an adjustment member to adjustably select the biasing pressure produced by the auxiliary pressure device.

7. The vaporizer of claim 1 wherein the diaphragm and the valve are connected together such that movement of the diaphragm toward the thermal expansion chamber moves the valve toward the closed configuration and movement of the diaphragm toward the liquefied gas inlet chamber moves the valve toward the open configuration.

8. A vaporizer for vaporizing a liquefied gas supplied by a source of liquefied gas, the vaporizer comprising:
  a heat exchanger having an inlet structured to accept liquefied gas, a heater to boil and superheat the accepted liquefied gas and thereby produce a gas vapor, and an outlet structured to release the gas vapor; and a capacity control valve having:
- a thermal expansion chamber, a liquefied gas inlet chamber and a liquefied gas outlet chamber,
- a pressure sensor configured to sense the differential pressure in the thermal expansion chamber and the liquefied gas inlet chamber,
- a temperature sensor configured to sense the temperature of the gas vapor produced by the heat exchanger and to produce a sensed temperature pressure in the thermal expansion chamber in response to the sensed temperature,
- a valve inlet in fluid communication with the liquefied gas inlet chamber and structured to be coupled to and accept the liquefied gas supplied by the source of liquefied gas,
- a valve outlet in fluid communication with the liquefied gas outlet chamber and connected to the heat exchanger inlet, and
- a valve positioned between the liquefied gas inlet chamber and the liquefied gas outlet chamber, the valve being movable toward a closed configuration to reduce the flow of liquefied gas from the liquefied gas inlet chamber to the liquefied gas outlet chamber and toward an open configuration to increase the flow of liquefied gas from the liquefied gas inlet chamber to the liquefied gas outlet chamber, the valve being moved toward the closed and open configurations in response to the pressure sensor sensing the differential pressure in the thermal expansion chamber and the liquefied gas inlet chamber, with the pressure in the thermal expansion chamber being dependent on the sensed temperature of the gas vapor produced by the heat exchanger and the pressure in the liquefied gas inlet chamber being dependent on the pressure of the liquefied gas supplied by the source of liquefied gas.

9. The vaporizer of claim 8, wherein the valve is movable fully to the closed configuration and to the open configuration.

10. The vaporizer of claim 8 wherein the temperature sensor is thermally coupled to the heat exchanger outlet.

11. The vaporizer of claim 8 wherein the temperature sensor includes an expansion fluid in fluid communication with the thermal expansion chamber, the expansion fluid being selected to expand and contract with the changes in temperature of the gas vapor produced by the heat exchanger.

12. The vaporizer of claim 11 wherein the expansion fluid is selected to have saturation properties similar to saturation properties of the liquefied gas supplied by the source of liquefied gas.

13. The vaporizer of claim 8 wherein the capacity control valve further includes an auxiliary pressure device producing a biasing pressure on the valve to bias the valve toward the closed configuration.

14. The vaporizer of claim 13 wherein the auxiliary pressure device has an adjustment member to adjustably select the biasing pressure produced by the auxiliary pressure device.

15. The vaporizer of claim 8 wherein the pressure sensor moves the valve toward the open configuration in response to the pressure sensor sensing the differential pressure one of increasing and decreasing, and moves the valve toward the closed configuration in response to the pressure sensor sensing the differential pressure the other of increasing and decreasing.

16. A vaporizer for vaporizing a liquefied gas supplied by a source of liquefied gas and useable with a heater to supply heat to the vaporizer, the vaporizer comprising:

a heat exchanger having an inlet and an outlet; and
a capacity control valve having:
- a temperature sensor configured to sense a temperature of gas vapor produced by the heat exchanger and to produce a sensed temperature pressure in response to the sensed temperature,
- a pressure sensor configured to sense a difference in the sensed temperature pressure and a pressure of the liquefied gas supplied by the source of liquefied gas,
- a valve inlet structured to be coupled to and accept the liquefied gas supplied by the source of liquefied gas,
- a valve outlet connected to the heat exchanger inlet, and
- a valve regulating the flow of liquefied gas between the valve inlet and the valve outlet, the valve being movable toward a closed configuration to reduce the flow of liquefied gas between the valve inlet and the valve outlet and toward an open configuration to increase the flow of liquefied gas between the valve inlet and the valve outlet, the valve being moved toward the closed and open configurations in response to variations in the difference in the sensed temperature pressure and the pressure of the liquefied gas supplied by the source of liquefied gas.

17. The vaporizer of claim 16, wherein the valve is movable fully to the closed configuration and to the open configuration.

18. The vaporizer of claim 16 wherein the temperature sensor is thermally coupled to the heat exchanger outlet.

19. The vaporizer of claim 16 wherein the capacity control valve further includes an auxiliary pressure device producing a biasing pressure on the valve to bias the valve toward the closed configuration.

20. The vaporizer of claim 19 wherein the auxiliary pressure device has an adjustment member to adjustably select the biasing pressure produced by the auxiliary pressure device.

21. The vaporizer of claim 16 wherein the pressure sensor moves the valve toward the open configuration in response to the pressure sensor sensing the difference in the sensed temperature pressure and a pressure of the liquefied gas supplied by the source of liquefied gas being one of increasing and decreasing, and moves the valve toward the closed configuration in response to the pressure sensor sensing the difference in the sensed temperature pressure and a pressure of the liquefied gas supplied by the source of liquefied gas being the other of increasing and decreasing.

22. A multiple vaporizer system for vaporizing a liquefied gas supplied by a source of liquefied gas, the vaporizer system comprising:

a manifold; and
a plurality of vaporizers, each of the vaporizers including:
(a) a heat exchanger having an inlet structured to accept liquefied gas, a heater to boil and superheat the accepted liquefied gas and thereby produce a gas vapor, and an outlet structured to release the gas vapor to the manifold, and
(b) a capacity control valve having a temperature sensor configured to sense the temperature of the gas vapor produced by the heat exchanger and to produce a sensed temperature pressure in response to the sensed temperature, a pressure sensor configured to sense the difference in the sensed temperature pressure and a pressure of the liquefied gas supplied by the source of liquefied gas, a valve inlet structured to be coupled to and accept the liquefied gas supplied by the source of liquefied gas, a valve outlet connected to the heat exchanger inlet, and a valve regulating the flow of liquefied gas between the valve inlet and the valve outlet, the valve being movable toward a closed configuration to reduce the flow of liquefied gas between the valve inlet and the valve outlet and toward an open configuration to increase the flow of liquefied gas between the valve inlet and the valve outlet, the valve being moved toward the closed and open configurations in response to the pressure sensor sensing the difference in the sensed temperature pressure and the pressure of the liquefied gas supplied by the source of liquefied gas.

23. The multiple vaporizer system of claim 22, wherein the valve of each of the vaporizers is movable fully to the closed configuration and to the open configuration.

24. The vaporizer of claim 22 wherein the temperature sensor of each of the vaporizers is thermally coupled to the heat exchanger outlet of the vaporizer.

25. The vaporizer of claim 22 wherein the capacity control valve of each of the vaporizers further includes an auxiliary pressure device producing a biasing pressure on the valve of the vaporizer to bias the valve toward the closed configuration.

26. The vaporizer of claim 25 wherein the auxiliary pressure device of each of the vaporizers has an adjustment member to adjustably select the biasing pressure produced by the auxiliary pressure device of the vaporizer.

27. The vaporizer of claim 22 wherein the pressure sensor of each of the vaporizers moves the valve of the vaporizer toward the open configuration in response to the pressure sensor of the vaporizer sensing the difference in the sensed temperature pressure and a pressure of the liquefied gas supplied by the source of liquefied gas being one of increasing and decreasing, and moves the valve of the vaporizer toward the closed configuration in response to the pressure sensor of the vaporizer sensing the difference in the sensed temperature pressure and a pressure of the liquefied gas supplied by the source of liquefied gas being the other of increasing and decreasing.

28. A method for vaporizing a liquefied gas supplied by a source of liquefied gas, comprising:

introducing a quantity of liquefied gas into a heat exchanger at a flow rate;

vaporizing the liquefied gas in the heat exchanger to produce a gas vapor;

sensing the temperature of the gas vapor produced by the heat exchanger;

generating a sensed temperature pressure in response to the sensed temperature;

sensing a difference in the sensed temperature pressure and a pressure of the liquefied gas supplied by the source of liquefied gas; and adjusting the flow rate of the liquefied gas into the heat exchanger in response to the difference in the sensed temperature pressure and the pressure of the liquefied gas supplied by the source of liquefied gas.

29. The method of claim 28, wherein adjusting the flow rate of the liquefied gas into the heat exchanger includes operating a valve controlling the flow rate of the liquefied gas into the heat exchanger.

30. A vaporizer for vaporizing a liquefied gas supplied by a source of liquefied gas and useable with a heat source, the vaporizer comprising:

a heat exchanger having an inlet structured to accept liquefied gas, a heat exchanger portion to boil and superheat the accepted liquefied gas to produce a gas vapor, and an outlet structured to release the gas vapor;

a temperature sensor arranged to sense the temperature of the gas vapor produced by the heat exchanger and produce a sensed temperature pressure in response to the sensed temperature;

a pressure sensor arranged to sense the difference in the sensed temperature pressure and a pressure of the liquefied gas supplied by the source of liquefied gas; and a flow regulator valve arranged to regulate the flow of liquefied gas from the source of liquefied gas to the heat exchanger inlet in response to the pressure sensor sensing the difference in the sensed temperature pressure and the pressure of the liquefied gas supplied by the source of liquefied gas.

31. The vaporizer of claim 30, wherein the temperature sensor is arranged to sense the temperature of the gas vapor at the heat exchanger outlet.

32. The vaporizer of claim 30 further including a biasing member producing a biasing force to bias the flow regulator to reduce the flow of liquefied gas to the heat exchanger inlet.

33. The vaporizer of claim 32 further including an adjustment member arranged to selectively adjust the biasing force produced by the biasing member.

34. The vaporizer of claim 30 wherein the flow regulator is arranged to increase the flow of liquefied gas to the heat exchanger inlet in response to the pressure sensor sensing the difference in the sensed temperature pressure and the pressure of the liquefied gas supplied by the source of liquefied gas being one of increasing and decreasing, and decrease the flow of liquefied gas to the heat exchanger inlet in response to the pressure sensor sensing the difference in the sensed temperature pressure and the pressure of the liquefied gas supplied by the source of liquefied gas being the other of increasing and decreasing.

35. The vaporizer of claim 30 wherein the flow regulator is a valve.

36. The vaporizer of claim 35 wherein the flow regulator is a control valve having a valve body with a liquefied gas inlet chamber and a liquefied gas outlet chamber, with a valve inlet in fluid communication with the liquefied gas inlet chamber and structured to be coupled to and accept the liquefied gas supplied by the source of liquefied gas, and a valve outlet in fluid communication with the liquefied gas outlet chamber and connected to the heat exchanger inlet, and having a valve positioned between the liquefied gas inlet chamber and the liquefied gas outlet chamber, the valve being movable toward a closed configuration to reduce the flow of liquefied gas from the liquefied gas inlet chamber to the liquefied gas outlet chamber and toward an open configuration to increase the flow of liquefied gas from the liquefied gas inlet chamber to the liquefied gas outlet chamber, the valve being moved toward the closed and open configurations in response to the pressure sensor sensing the difference in the sensed temperature pressure and the pressure of the liquefied gas supplied by the source of liquefied gas.

37. The vaporizer of claim 30 wherein the flow regulator includes:

a first valve assembly having a first valve body with a first liquefied gas inlet chamber and a first liquefied gas outlet chamber, a first valve inlet in fluid communication with the first liquefied gas inlet chamber and structured to be coupled to and accept the liquefied gas supplied by the source of liquefied gas, a first valve outlet in fluid communication with the first liquefied gas outlet chamber, and a first valve positioned between the first liquefied gas inlet chamber and the first liquefied gas outlet chamber, the first valve being movable toward a closed configuration to reduce the flow of liquefied gas from the first liquefied gas inlet chamber to the first liquefied gas outlet chamber and toward an open configuration to increase the flow of liquefied gas from the first liquefied gas inlet chamber to the first liquefied gas outlet chamber, the first valve being moved toward the closed and open configurations in response to the pressure sensor sensing the difference in the sensed temperature pressure and the pressure of the liquefied gas supplied by the source of liquefied gas; and a second valve assembly having a second valve body with a second expansion chamber, a second liquefied gas inlet chamber and a second liquefied gas outlet chamber, the second expansion chamber being connected to the first valve outlet of the first valve assembly, a second valve inlet in fluid communication with the second liquefied gas inlet chamber and structured to be coupled to and accept the liquefied gas supplied by the source of liquefied gas, a second valve outlet in fluid communication with the second liquefied gas outlet chamber and connected to the heat exchanger inlet, and a second valve positioned between the second liquefied gas inlet chamber and the second liquefied gas outlet chamber, the second valve being movable toward a closed configuration to reduce the flow of liquefied gas from the second liquefied gas inlet chamber to the second liquefied gas outlet chamber and toward an open configuration to increase the flow of liquefied gas from the second liquefied gas inlet chamber to the second liquefied gas outlet chamber, the second valve being moved toward the closed and open configurations in response to changes in the pressure in the expansion chamber of the second valve assembly, with the pressure in the expansion chamber of the second valve assembly being dependent on the pressure in the valve outlet of the first valve assembly.

38. The vaporizer of claim 37 further including a pressure regulator, and wherein the first valve outlet of the first valve assembly is connected to the second expansion chamber of the second valve assembly through the pressure regulator.

39. The vaporizer of claim 38 wherein the pressure regulator includes an inlet chamber, an outlet chamber and a sensing conduit, the pressure regulator inlet chamber being connected to the first valve outlet of the first valve assembly, the pressure regulator outlet chamber being connected to the second expansion chamber of the second valve assembly, and the pressure regulator sensing conduit being connected to the heat exchanger inlet.

40. The vaporizer of claim 30 wherein the flow regulator includes:

a first valve assembly having a first valve body with a first liquefied gas inlet chamber and a first liquefied gas outlet chamber, a first valve inlet in fluid communication with the first liquefied gas inlet chamber and structured to be coupled to and accept the liquefied gas supplied by the source of liquefied gas, a first valve outlet in fluid communication with the first liquefied gas outlet chamber, and a first valve positioned between the first liquefied gas inlet chamber and the first liquefied gas outlet chamber, the first valve being movable toward a closed configuration to reduce the flow of liquefied gas from the first liquefied gas inlet chamber to the first liquefied gas outlet chamber and toward an open configuration to increase the flow of liquefied gas from the first liquefied gas inlet chamber to the first liquefied gas outlet chamber, the first valve being moved toward the closed and open configurations in response to the pressure sensor sensing the difference in the sensed temperature pressure and the pressure of the liquefied gas supplied by the source of liquefied gas; and a second valve having a second valve body with a second liquefied gas inlet chamber and a second liquefied gas outlet chamber, a second valve inlet in fluid communication with the second liquefied gas inlet chamber and structured to be coupled to and accept the liquefied gas supplied by the source of liquefied gas, a second valve outlet in fluid communication with the second liquefied gas outlet chamber and connected to the heat exchanger inlet, and a second valve positioned between the second liquefied gas inlet chamber and the second liquefied gas outlet chamber, the second valve being movable toward a closed configuration to reduce the flow of liquefied gas from the second liquefied gas inlet chamber to the second liquefied gas outlet chamber and toward an open configuration to increase the flow of liquefied gas from the second liquefied gas inlet chamber to the second liquefied gas outlet chamber, the first valve outlet of the first valve being connected to the second valve assembly in a manner to control operation of the second valve of the second valve assembly with the second valve of the second valve assembly being moved toward the closed and open configurations in response to changes in the pressure in the valve first outlet of the first valve.

41. A vaporizer for vaporizing a liquefied gas supplied by a source of liquefied gas, the vaporizer comprising:

a heat exchanger having an inlet structured to accept liquefied gas, a plurality of positive temperature coefficient heater elements operable to supply heat to boil and superheat the accepted liquefied gas to produce a gas vapor, and an outlet structured to release the gas vapor;

a temperature sensor arranged to sense the temperature of the gas vapor produced by the heat exchanger and produce a sensed temperature pressure in response to the sensed temperature;

a pressure sensor arranged to sense the difference in the sensed temperature pressure and a pressure of the liquefied gas supplied by the source of liquefied gas; and a flow regulator valve arranged to regulate the flow of liquefied gas from the source of liquefied gas to the heat exchanger inlet in response to the pressure sensor sensing the difference in the sensed temperature pressure and the pressure of the liquefied gas supplied by the source of liquefied gas.

42. The vaporizer of claim 41, wherein the heat exchanger includes a mass of thermally conductive material with a tube embedded therein to transfer heat from the thermally conductive material to the contents of the tube, the tube having an inlet comprising the heat exchanger inlet and an outlet comprising the heat exchanger outlet.

43. The vaporizer of claim 42, wherein the mass of thermally conductive material is formed into a block with a planar surface portion and the heater elements are each flat with a substantially planar surface, the planar surfaces of the heater elements being in coplanar parallel arrangement with the planar surface portion of the block.

44. The vaporizer of claim 41, wherein the heat exchanger includes a first block of thermally conductive material with a first tube embedded therein to transfer heat from the thermally conductive material of the first block to the contents of the first tube, the first block having a surface portion, the first tube having an inlet portion comprising the heat exchanger inlet and an outlet portion, and a second block of thermally conductive material with a second tube embedded therein to transfer heat from the thermally conductive material of the second block to the contents of the second tube, the second block having a surface portion, the second tube having an inlet portion connected to the outlet portion of the first block and an outlet portion comprising the heat exchanger outlet, the first and second blocks being arranged with the surface portions thereof facing each other, and the heater elements each being formed with first and second opposed surfaces and being positioned between the first and second blocks with the first surfaces of the heater elements in thermal contact with the surface portion of the first block and with the second surfaces of the heater elements in thermal contact with the surface portion of the second block.

45. The vaporizer of claim 44, further including at least one member holding the first and second blocks tightly together with the heater elements positioned therebetween clamped tightly between the surface portions of the first and second blocks.

46. A vaporizer for vaporizing a liquefied gas supplied by a source of liquefied gas, the vaporizer comprising:
first means for superheating the liquefied gas supplied by the source of liquefied gas to produce a gas vapor;
second means for sensing the temperature of the produced gas vapor and producing a sensed temperature pressure in response to the sensed temperature;
third means for sensing a difference in the sensed temperature pressure and a pressure of the liquefied gas supplied by the source of liquefied gas; and
fourth means for regulating a flow of liquefied gas from the source of liquefied gas to the first means in response to the difference sensed by the third means.

47. The vaporizer of claim 46, wherein the first means includes means for outputting the produced gas vapor and the second means senses the temperature of the produced gas vapor at the outputting means.

48. The vaporizer of claim 46 further including fifth means for producing a biasing pressure to bias the fourth means to reduce the flow of liquefied gas to the first means.

49. The vaporizer of claim 48, further including sixth means for selectively adjusting the biasing pressure produced by the fifth means.

50. The vaporizer of claim 46 wherein the fourth means increases the flow of liquefied gas to the first means in response to the third means sensing the difference in the sensed temperature pressure and the pressure of the liquefied gas supplied by the source of liquefied gas being one of increasing and decreasing, and decreases the flow of liquefied gas to the first means in response to the third means sensing the difference in the sensed temperature pressure and the pressure of the liquefied gas supplied by the source of liquefied gas being the other of increasing and decreasing.

51. The vaporizer of claim 1 wherein the liquefied gas is liquefied petroleum gas.

52. The vaporizer of claim 16 wherein the liquefied gas is liquefied petroleum gas.

53. A device for regulating flow of a liquefied gas into a heat exchanger to be vaporized, comprising:
a temperature sensor configured to produce, at an output, a first pressure proportionate to a temperature of a gas vapor flowing out of the heat exchanger; and
a flow regulator having a first input coupled to the output of the temperature sensor, a second input coupled to a source of liquefied gas and configured to receive a flow of liquefied gas at a second pressure, and an output configured to be coupled to an input of the heat exchanger, the regulator configured to compare the first pressure to the second pressure and to adjust a flow of liquefied gas from the second input to the output to a flow rate selected according to a pressure differential of the first and second pressures.

54. A vaporizer for vaporizing a liquefied gas supplied by a source of liquefied gas and useable with a heat source, the vaporizer comprising:
a heat exchanger having an inlet structured to accept liquefied gas, a heat exchanger portion to boil and superheat the accepted liquefied gas to produce a gas vapor, and an outlet structured to release the gas vapor;
a temperature sensor arranged to sense the temperature of the gas vapor produced by the heat exchanger and produce a sensed temperature pressure in response to the sensed temperature;
a pressure sensor arranged to sense the difference in the sensed temperature pressure and a pressure of the liquefied gas supplied by the source of liquefied gas; and
a flow regulator valve arranged to regulate the flow of liquefied gas from the source of liquefied gas to the heat exchanger inlet in response to the pressure sensor sensing the difference in the sensed temperature pressure and the pressure of the liquefied gas supplied by the source of liquefied gas, the flow regulator including a first valve assembly having a first valve body with a first liquefied gas inlet chamber and a first liquefied gas outlet chamber, a first valve inlet in fluid communication with the first liquefied gas inlet chamber and structured to be coupled to and accept the liquefied gas supplied by the source of liquefied gas, a first valve outlet in fluid communication with the first liquefied gas outlet chamber, and a first valve positioned between the first liquefied gas inlet chamber and the first liquefied gas outlet chamber, the first valve being movable toward a closed configuration to reduce the flow of liquefied gas from the first liquefied gas inlet chamber to the first liquefied gas outlet chamber and toward an open configuration to increase the flow of liquefied gas from the first liquefied gas inlet chamber to the first liquefied gas outlet chamber, the first valve being moved toward the closed and open configurations in response to the pressure sensor sensing the difference in the sensed temperature pressure and the pressure of the liquefied gas supplied by the source of liquefied gas; and a second valve assembly having a second valve body with a second expansion chamber, a second liquefied gas inlet chamber and a second liquefied gas outlet chamber, the second expansion chamber being connected to the first valve outlet of the first valve assembly, a second valve inlet in fluid communication with the second liquefied gas inlet chamber and structured to be coupled to and accept the liquefied gas supplied by the source of liquefied gas, a second valve outlet in fluid communication with the second liquefied gas outlet chamber and connected to the heat exchanger inlet, and a second valve positioned between the second liquefied gas inlet chamber and the second liquefied gas outlet chamber, the second valve being movable toward a closed configuration to reduce the flow of liquefied gas from the second liquefied gas inlet chamber to the second liquefied gas outlet chamber and toward an open configuration to increase the flow of liquefied gas from the second liquefied gas inlet chamber to the second liquefied gas outlet chamber, the second valve being moved toward the closed and open configurations in response to changes in the pressure in the expansion chamber of the second valve assembly, with the pressure in the expansion chamber of the second valve assembly being dependent on the pressure in the valve outlet of the first valve assembly.

55. A vaporizer for vaporizing a liquefied gas supplied by a source of liquefied gas and useable with a heat source, the vaporizer comprising:

a heat exchanger having an inlet structured to accept liquefied gas, a heat exchanger portion to boil and superheat the accepted liquefied gas to produce a gas vapor, and an outlet structured to release the gas vapor;

a temperature sensor arranged to sense the temperature of the gas vapor produced by the heat exchanger and produce a sensed temperature pressure in response to the sensed temperature;

a pressure sensor arranged to sense the difference in the sensed temperature pressure and a pressure of the liquefied gas supplied by the source of liquefied gas; and a flow regulator valve arranged to regulate the flow of liquefied gas from the source of liquefied gas to the heat exchanger inlet in response to the pressure sensor sensing the difference in the sensed temperature pressure and the pressure of the liquefied gas supplied by the source of liquefied gas, the flow regulator including a first valve assembly having a first valve body with a first liquefied gas inlet chamber and a first liquefied gas outlet chamber, a first valve inlet in fluid communication with the first liquefied gas inlet chamber and structured to be coupled to and accept the liquefied gas supplied by the source of liquefied gas, a first valve outlet in fluid communication with the first liquefied gas outlet chamber, and a first valve positioned between the first liquefied gas inlet chamber and the first liquefied gas outlet chamber, the first valve being movable toward a closed configuration to reduce the flow of liquefied gas from the first liquefied gas inlet chamber to the first liquefied gas outlet chamber and toward an open configuration to increase the flow of liquefied gas from the first liquefied gas inlet chamber to the first liquefied gas outlet chamber, the first valve being moved toward the closed and open configurations in response to the pressure sensor sensing the difference in the sensed temperature pressure and the pressure of the liquefied gas supplied by the source of liquefied gas; and a second valve having a second valve body with a second liquefied gas inlet chamber and a second liquefied gas outlet chamber, a second valve inlet in fluid communication with the second liquefied gas inlet chamber and structured to be coupled to and accept the liquefied gas supplied by the source of liquefied gas, a second valve outlet in fluid communication with the second liquefied gas outlet chamber and connected to the heat exchanger inlet, and a second valve positioned between the second liquefied gas inlet chamber and the second liquefied gas outlet chamber, the second valve being movable toward a closed configuration to reduce the flow of liquefied gas from the second liquefied gas inlet chamber to the second liquefied gas outlet chamber and toward an open configuration to increase the flow of liquefied gas from the second liquefied gas inlet chamber to the second liquefied gas outlet chamber, the first valve outlet of the first valve being connected to the second valve assembly in a manner to control operation of the second valve of the second valve assembly with the second valve of the second valve assembly being moved toward the closed and open configurations in response to changes in the pressure in the valve first outlet of the first valve.

56. A vaporizer for vaporizing a liquefied gas supplied by a source of liquefied gas, the vaporizer comprising:

a heat exchanger having an inlet structured to accept liquefied gas, a plurality of positive temperature coefficient heater elements operable to supply heat to boil and superheat the accepted liquefied gas to produce a gas vapor, and an outlet structured to release the gas vapor, the heat exchanger including a first block of thermally conductive material with a first tube embedded therein to transfer heat from the thermally conductive material of the first block to the contents of the first tube, the first block having a surface portion, the first tube having an inlet portion comprising the heat exchanger inlet and an outlet portion, and a second block of thermally conductive material with a second tube embedded therein to transfer heat from the thermally conductive material of the second block to the contents of the second tube, the second block having a surface portion, the second tube having an inlet portion connected to the outlet portion of the first block and an outlet portion comprising the heat exchanger outlet, the first and second blocks being arranged with the surface portions thereof facing each other, and the heater elements each being formed with first and second opposed surfaces and being positioned between the first and second blocks with the first surfaces of the heater elements in thermal contact with the surface portion of the first block and with the second surfaces of the heater elements in thermal contact with the surface portion of the second block;

a temperature sensor arranged to sense the temperature of the gas vapor produced by the heat exchanger and produce a sensed temperature pressure in response to the sensed temperature;

a pressure sensor arranged to sense the difference in the sensed temperature pressure and a pressure of the liquefied gas supplied by the source of liquefied gas; and a flow regulator valve arranged to regulate the flow of liquefied gas from the source of liquefied gas to the heat exchanger inlet in response to the pressure sensor sensing the difference in the sensed temperature pressure and the pressure of the liquefied gas supplied by the source of liquefied gas.

* * * * *